United States Patent
Madigan et al.

(10) Patent No.: US 10,479,020 B2
(45) Date of Patent: Nov. 19, 2019

(54) SYSTEMS AND METHODS FOR MEASURING RADIATED THERMAL ENERGY DURING AN ADDITIVE MANUFACTURING OPERATION

(71) Applicant: Sigma Labs, Inc., Santa Fe, NM (US)

(72) Inventors: R. Bruce Madigan, Butte, MT (US); Lars Jacquemetton, Santa Fe, NM (US); Glenn Wikle, Santa Fe, NM (US); Mark J. Cola, Santa Fe, NM (US); Vivek R. Dave, Concord, NH (US); Darren Beckett, Corrales, NM (US); Alberto M. Castro, Santa Fe, NM (US)

(73) Assignee: SIGMA LABS, INC., Santa Fe, NM (US)

( * ) Notice: Subject to any disclaimer, the term of this patent is extended or adjusted under 35 U.S.C. 154(b) by 0 days.

(21) Appl. No.: 16/052,488

(22) Filed: Aug. 1, 2018

(65) Prior Publication Data
US 2019/0039318 A1  Feb. 7, 2019

Related U.S. Application Data

(60) Provisional application No. 62/540,016, filed on Aug. 1, 2017, provisional application No. 62/633,487, filed
(Continued)

(51) Int. Cl.
*B29C 64/393* (2017.01)
*B22F 3/105* (2006.01)
(Continued)

(52) U.S. Cl.
CPC .......... *B29C 64/393* (2017.08); *B22F 3/1055* (2013.01); *B23K 15/0086* (2013.01);
(Continued)

(58) Field of Classification Search
CPC .......... B33Y 50/02; G05B 2219/49018; B23K 26/342; B23K 26/032; B23K 26/03;
(Continued)

(56) References Cited

U.S. PATENT DOCUMENTS

| 5,552,575 A | * | 9/1996 | Doumanidis | ........ B23K 9/0953 219/121.14 |
| 6,055,060 A | | 4/2000 | Bolduan et al. | |

(Continued)

FOREIGN PATENT DOCUMENTS

| WO | WO-2015121730 A1 | * | 8/2015 | ............. B33Y 40/00 |
| WO | 2017071741 A1 | | 5/2017 | |

OTHER PUBLICATIONS

PCT/US2018/044884, "International Search Report and Written Opinion", dated Oct. 15, 2018, 8 pages.
(Continued)

*Primary Examiner* — Geoffrey S Evans
(74) *Attorney, Agent, or Firm* — Kilpatrick Townsend & Stockton LLP

(57) ABSTRACT

This disclosure describes various methods and apparatus for characterizing an additive manufacturing process. A method for characterizing the additive manufacturing process can include generating scans of an energy source across a build plane; measuring an amount of energy radiated from the build plane during each of the scans using an optical sensor; determining an area of the build plane traversed during the scans; determining a thermal energy density for the area of the build plane traversed by the scans based upon the amount of energy radiated and the area of the build plane traversed by the scans; mapping the thermal energy density to one or more location of the build plane; determining that the thermal energy density is characterized by a density outside a range of density values; and thereafter, adjusting subse- (Continued)

quent scans of the energy source across or proximate the one or more locations of the build plane.

20 Claims, 33 Drawing Sheets

Related U.S. Application Data on Feb. 21, 2018, provisional application No. 62/643,457, filed on Mar. 15, 2018.

(51) Int. Cl.
| | | |
|---|---|---|
| *B23K 26/342* | (2014.01) | |
| *B23K 26/03* | (2006.01) | |
| *B33Y 50/02* | (2015.01) | |
| *B33Y 10/00* | (2015.01) | |
| *B23K 15/00* | (2006.01) | |
| *B23K 31/12* | (2006.01) | |
| *B23K 26/70* | (2014.01) | |
| *B33Y 50/00* | (2015.01) | |
| *B23K 101/00* | (2006.01) | |

(52) U.S. Cl.
CPC .......... *B23K 26/032* (2013.01); *B23K 26/342* (2015.10); *B23K 26/70* (2015.10); *B23K 31/125* (2013.01); *B33Y 10/00* (2014.12); *B33Y 50/00* (2014.12); *B33Y 50/02* (2014.12); *B22F 2003/1057* (2013.01); *B22F 2203/11* (2013.01); *B23K 2101/001* (2018.08)

(58) Field of Classification Search
CPC ............ B22F 3/1055; B22F 2003/1056; B22F 2003/1057; B29C 64/386
See application file for complete search history.

(56) References Cited

U.S. PATENT DOCUMENTS

| | | | |
|---|---|---|---|
| 6,313,913 B1 | 11/2001 | Nakagawa et al. | |
| 6,707,554 B1 | 3/2004 | Miltner et al. | |
| 7,515,986 B2 * | 4/2009 | Huskamp | G05D 23/1919 219/405 |
| 8,137,739 B2 * | 3/2012 | Philippi | B29C 64/153 427/595 |
| 9,925,715 B2 | 3/2018 | Cheverton et al. | |
| 2003/0234239 A1 | 12/2003 | Lee et al. | |
| 2004/0200816 A1 * | 10/2004 | Chung | G05D 23/1919 219/121.83 |
| 2004/0247170 A1 | 12/2004 | Furze et al. | |
| 2008/0273758 A1 | 11/2008 | Fuchs et al. | |
| 2009/0268029 A1 | 10/2009 | Haussmann et al. | |
| 2010/0249979 A1 * | 9/2010 | John | G03F 7/0037 700/120 |
| 2010/0256945 A1 * | 10/2010 | Murata | G01J 5/0003 702/134 |
| 2011/0254811 A1 | 10/2011 | Lawrence et al. | |
| 2012/0287443 A1 | 11/2012 | Lin et al. | |
| 2012/0327428 A1 | 12/2012 | Hellwig et al. | |
| 2013/0105447 A1 * | 5/2013 | Haake | B23K 26/34 219/76.14 |
| 2014/0314613 A1 | 10/2014 | Hopkinson et al. | |
| 2015/0048058 A1 | 2/2015 | Bruck et al. | |
| 2016/0185048 A1 | 6/2016 | Dave et al. | |
| 2017/0016781 A1 * | 1/2017 | Dave | G01J 3/28 |
| 2017/0090462 A1 * | 3/2017 | Dave | G01N 21/00 |
| 2017/0102689 A1 * | 4/2017 | Khajepour | G05B 19/4099 |
| 2017/0151628 A1 | 6/2017 | Craig et al. | |
| 2017/0266762 A1 | 9/2017 | Dave et al. | |
| 2018/0020207 A1 | 1/2018 | Sugimura et al. | |
| 2018/0169948 A1 * | 6/2018 | Coeck | B33Y 50/02 |
| 2018/0186079 A1 * | 7/2018 | Vilajosana | B29C 64/165 |
| 2018/0281286 A1 * | 10/2018 | Vilajosana | B29C 64/295 |
| 2018/0345649 A1 * | 12/2018 | Prakash | B33Y 50/02 |
| 2019/0009463 A1 * | 1/2019 | Vilajosana | B33Y 50/02 |
| 2019/0039318 A1 | 2/2019 | Madigan et al. | |
| 2019/0047226 A1 * | 2/2019 | Ishikawa | B33Y 10/00 |
| 2019/0095555 A1 * | 3/2019 | Lopez | B33Y 50/00 |
| 2019/0118300 A1 * | 4/2019 | Penny | B23K 26/342 |

OTHER PUBLICATIONS

PCT/US2019/019009, "International Search Report and Written Opinion", dated May 8, 2019, 7 pages.
U.S. Appl. No. 16/282,016, "Non-Final Office Action", dated Sep. 3, 2019, 14 pages.

* cited by examiner $$TotalSampleCount = \sum_{i=0}^{\infty} t(s) LaserOn$$

SYSTEMS AND METHODS FOR MEASURING RADIATED THERMAL ENERGY DURING AN ADDITIVE MANUFACTURING OPERATION

CROSS-REFERENCES TO RELATED APPLICATIONS

This application claims priority to U.S. Provisional Patent Application Nos. 62/540,016, filed on Aug. 1, 2017, 62/633,487, filed on Feb. 21, 2018 and 62/643,457, filed on Mar. 15, 2018, each of which are entitled "Systems And Methods For Measuring Energy Input During An Additive Manufacturing Operation", the disclosures of which are hereby incorporated by reference in their entirety and for all purposes.

BACKGROUND OF THE INVENTION

Additive manufacturing, or the sequential assembly or construction of a part through the combination of material addition and applied energy, takes on many forms and currently exists in many specific implementations and embodiments. Additive manufacturing can be carried out by using any of a number of various processes that involve the formation of a three dimensional part of virtually any shape. The various processes have in common the sintering, curing or melting of liquid, powdered or granular raw material, layer by layer using ultraviolet light, high powered laser, or electron beam, respectively. Unfortunately, established processes for determining a quality of a resulting part manufactured in this way are limited. Conventional quality assurance testing generally involves post-process measurements of mechanical, geometrical, or metallurgical properties of the part, which frequently results in destruction of the part. While destructive testing is an accepted way of validating a part's quality, as it allows for close scrutiny of various internal features of the part, such tests cannot for obvious reasons be applied to a production part. Consequently, ways of non-destructively and accurately verifying the mechanical, geometrical and metallurgical properties of a production part produced by additive manufacturing are desired.

SUMMARY OF THE INVENTION

The described embodiments are related to additive manufacturing, which involves using an energy source that takes the form of a moving region of intense thermal energy. In the event that this thermal energy causes physical melting of the added material, then these processes are known broadly as welding processes. In welding processes, the material, which is incrementally and sequentially added, is melted by the energy source in a manner similar to a fusion weld. Exemplary welding processes suitable for use with the described embodiments include processes using a scanning energy source with powder bed and wire-fed processes using either an arc, laser or electron beam as the energy source.

When the added material takes the form of layers of powder, after each incremental layer of powder material is sequentially added to the part being constructed, the scanning energy source melts the incrementally added powder by welding regions of the powder layer creating a moving molten region, hereinafter referred to as the melt pool, so that upon solidification they become part of the previously sequentially added and melted and solidified layers below the new layer to form the part being constructed. As additive machining processes can be lengthy and include any number of passes of the melt pool, it can be difficult to avoid at least slight variations in the size and temperature of the melt pool as the melt pool is used to solidify the part. Embodiments described herein reduce or minimize discontinuities caused by the variations in size and temperature of the melt pool. It should be noted that additive manufacturing processes can be driven by one or more processors associated with a computer numerical control (CNC) due to the high rates of travel of the heating element and complex patterns needed to form a three dimensional structure.

An overall object of the described embodiments is to apply optical sensing techniques for example, quality inference, process control, or both, to additive manufacturing processes. Optical sensors can be used to track the evolution of in-process physical phenomena by tracking the evolution of their associated in-process physical variables. Herein optical can include that portion of the electromagnetic spectrum that includes near infrared (IR), visible, and well as near ultraviolet (UV). Generally the optical spectrum is considered to go from 380 nm to 780 nm in terms of wavelength. However near UV and IR could extend as low as 1 nm and as high as 3000 nm in terms of wavelength respectively. Sensor readings collected from optical sensors can be used to determine in process quality metrics (IPQMs). One such IPQM is thermal energy density (TED), which is helpful in characterizing the amount of energy applied to different regions of the part.

TED is a metric that is sensitive to user-defined laser powder bed fusion process parameters, for example, laser power, laser speed, hatch spacing, etc. This metric can then be used for analysis using IPQM comparison to a baseline dataset. The resulting IPQM can be calculated for every scan and displayed in a graph or in three dimensions using a point-cloud. Also, IPQM comparisons to the baseline dataset indicative of manufacturing defects may be used to generate control signals for process parameters. In some embodiments, where detailed thermal analysis is desired, thermal energy density can be determined for discrete portions of each scan. In some embodiments, thermal energy data from multiple scans can be divided into discrete grid regions of a grid, allowing each grid region to reflect a total amount of energy received at each grid region for a layer or a pre-defined number of layers.

An additive manufacturing method is disclosed and includes the following: generating a plurality of scans of an energy source across a build plane; measuring an amount of energy radiated from the build plane during each of the plurality of scans using an optical sensor monitoring the build plane; determining an area of the build plane traversed during the plurality of scans; determining a thermal energy density for the area of the build plane traversed by the plurality of scans based upon the amount of energy radiated and the area of the build plane traversed by the plurality of scans; mapping the thermal energy density to one or more location of the build plane; determining that the thermal energy density is characterized by a density outside a range of density values; and thereafter, adjusting subsequent scans of the energy source across or proximate the one or more locations of the build plane.

An additive manufacturing method is disclosed and includes the following: generating a scan of an energy source across a build plane; measuring an amount of energy radiated from the powder bed during the scan using an optical sensor monitoring the powder bed; determining an area associated with the scan; determining a thermal energy density for the area of the scan based upon the amount of energy radiated and the area of the scan; determining that the thermal energy density is characterized by a density outside a range of density values; and thereafter, adjusting a subsequent scan of the energy source across the build plane.

An additive manufacturing method is disclosed and includes the following performing an additive manufacturing operation using an energy source; receiving sensor data associated with a photodiode during a scan of the energy source across a powder bed; receiving drive signal data that indicates when the energy source is powered on; identifying sensor data collected when the energy source is powered on using the energy source drive signal data; dividing the sensor data into a plurality of sample sections, each of the sample sections corresponding to a portion of a scan; determining a thermal energy density for each of the plurality of sample sections; and identifying one or more portions of the part most likely to contain manufacturing defects based on the thermal energy density of each of the plurality of sample sections.

An additive manufacturing method is disclosed and includes the following: generating a plurality of scans of an energy source across a build plane; determining a grid region including the plurality of scans, wherein the grid region is characterized by a grid area; generating sensor readings during each of the plurality of scans using an optical sensor; determining a total amount of energy radiated from the build plane during the plurality of scans using the sensor readings; computing a thermal energy density associated with the grid region based upon the total amount of energy radiated and the grid area; determining that the thermal energy density associated with the grid region is characterized by a thermal energy density outside a range of thermal energy density values; and thereafter, adjusting an output of the energy source.

An additive manufacturing method is disclosed and includes the following: defining a portion of a build plane as a grid including a plurality of grid regions each having a grid region area; generating a plurality of scans of an energy source across the build plane; generating sensor readings during each of the plurality of scans using an optical sensor; for each of the plurality of scans, mapping portions of each of the plurality of sensor readings to a respective one of the plurality of grid regions; for each of the plurality of grid regions: summing the sensor readings mapped to each grid region; and computing a grid-based thermal energy density based on the summed sensor readings and the grid region area; determining that the grid-based thermal energy density associated with one or more of the plurality of grid regions is characterized by a thermal energy density outside a range of thermal energy density values; and thereafter, adjusting an output of the energy source.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
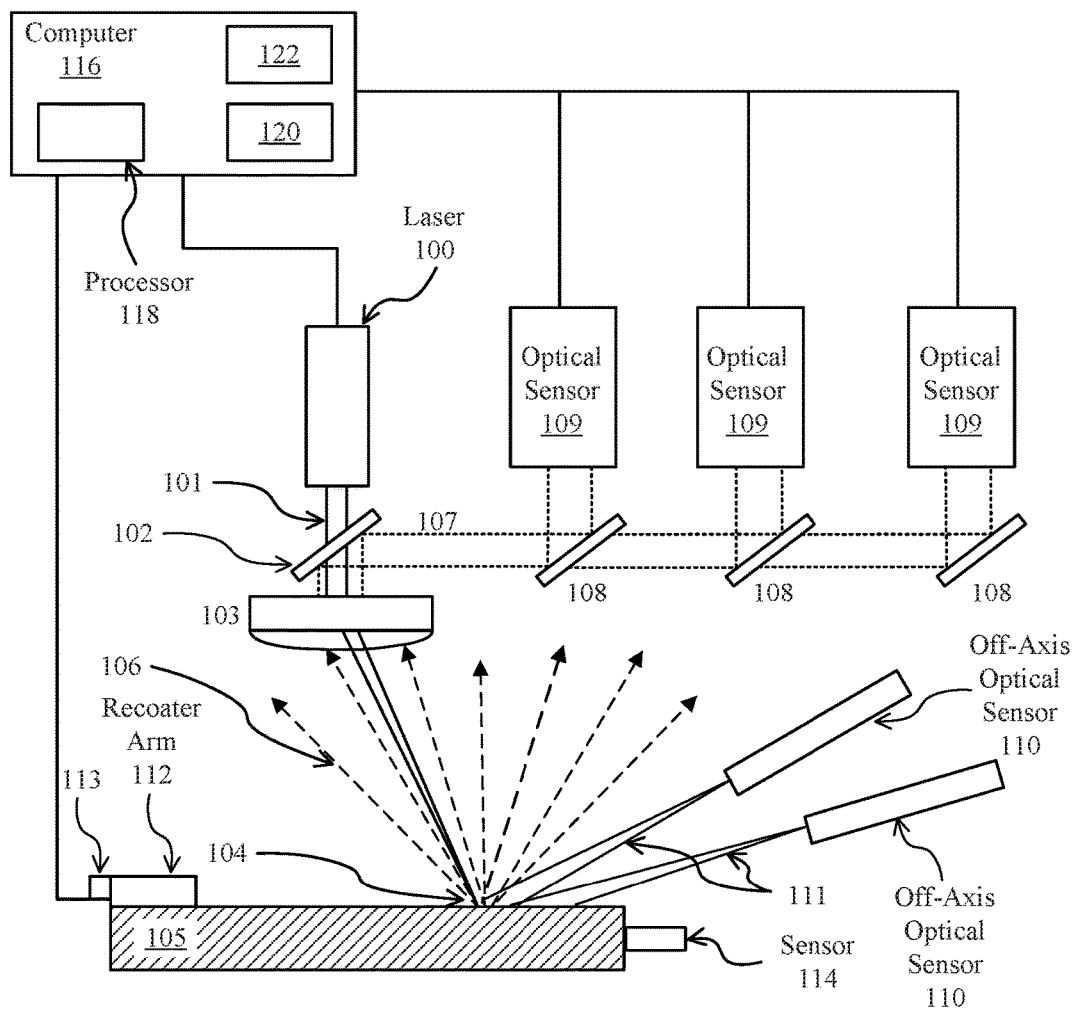
FIG. 1A is a schematic illustration of an optical sensing apparatus used in an additive manufacturing system with an energy source, in this specific instance taken to be a laser beam.

FIG. 1A shows an embodiment of an additive manufacturing system that uses one or more optical sensing apparatus to determine the thermal energy density. The thermal energy density is sensitive to changes in process parameters such as, for example, energy source power, energy source speed, and hatch spacing. The additive manufacturing system of FIG. 1A uses a laser 100 as the energy source. The laser 100 emits a laser beam 101 which passes through a partially reflective mirror 102 and enters a scanning and focusing system 103 which then projects the beam to a small region 104 on the work platform 105. In some embodiments, the work platform is a powder bed. Optical energy 106 is emitted from the small region 104 on account of high material temperatures.

In some embodiments, the scanning and focusing system 103 can be configured to collect some of the optical energy 106 emitted from the beam interaction region 104. The partially reflective mirror 102 can reflect the optical energy 106 as depicted by optical signal 107. The optical signal 107 may be interrogated by multiple on-axis optical sensors 109 each receiving a portion of the optical signal 107 through a series of additional partially reflective mirrors 108. It should be noted that in some embodiments, the additive manufacturing system could only include one on-axis optical sensor 109 with a fully reflective mirror 108.

It should be noted that the collected optical signal 107 may not have the same spectral content as the optical energy 106 emitted from the beam interaction region 104 because the signal 107 has suffered some attenuation after going through multiple optical elements such as partially reflective mirror 102, scanning and focusing system 103, and the series of additional partially reflective mirrors 108. These optical elements may each have their own transmission and absorption characteristics resulting in varying amounts of attenuation that thus limit certain portions of the spectrum of energy radiated from the beam interaction region 104. The data generated by on-axis optical sensors 109 may correspond to an amount of energy imparted on the work platform.

Examples of on-axis optical sensors 109 include but are not limited to photo to electrical signal transducers (i.e. photodetectors) such as pyrometers and photodiodes. The optical sensors can also include spectrometers, and low or high speed cameras that operate in the visible, ultraviolet, or the infrared frequency spectrum. The on-axis optical sensors 109 are in a frame of reference which moves with the beam, i.e., they see all regions that are touched by the laser beam and are able to collect optical signals 107 from all regions of the work platform 105 touched as the laser beam 101 scans across work platform 105. Because the optical energy 106 collected by the scanning and focusing system 103 travels a path that is near parallel to the laser beam, sensors 109 can be considered on-axis sensors.

In some embodiments, the additive manufacturing system can include off-axis sensors 110 that are in a stationary frame of reference with respect to the laser beam 101. These off-axis sensors 110 will have a given field of view 111 which could be very narrow or it could encompass the entire work platform 105. Examples of these sensors could include but are not limited to pyrometers, photodiodes, spectrometers, high or low speed cameras operating in visible, ultraviolet, or IR spectral ranges, etc. Off-axis sensors 110, not aligned with the energy source, are considered off-axis sensors. Off-axis sensors 110 could also be sensors which combine a series of physical measurement modalities such as a laser ultrasonic sensor which could actively excite or "ping" the deposit with one laser beam and then use a laser interferometer to measure the resultant ultrasonic waves or "ringing" of the structure in order to measure or predict mechanical properties or mechanical integrity of the deposit as it is being built. The laser ultrasonic sensor/interferometer system can be used to measure the elastic properties of the material, which can provide insight into, for example, the porosity of the material and other materials properties. Additionally, defect formation that results in material vibration can be measured using the laser ultrasonic/sensor interferometer system.

Additionally, there could be contact sensors 113 on the mechanical device, recoater arm 112, which spreads the powders. These sensors could be accelerometers, vibration sensors, etc. Lastly, there could be other types of sensors 114. These could include contact sensors such as thermocouples to measure macro thermal fields or could include acoustic emission sensors which could detect cracking and other metallurgical phenomena occurring in the deposit as it is being built. These contact sensors can be utilized during the powder addition process to characterize the operation of the recoater arm 112. Data collected by the on-axis optical sensors 109 and the off-axis sensors 110 can be used to detect process parameters associated with the recoater arm 112. Accordingly, non-uniformities in the surface of the spread powder can be detected and addressed by the system. Rough surfaces resulting from variations in the powder spreading process can be characterized by contact sensors 113 in order to anticipate possible problem areas or non-uniformities in the resulting part.

In some embodiments, a peak in the powder spread can be fused by the laser beam 101, resulting in the subsequent layer of powder having a corresponding peak. At some point, the peak could contact the recoater arm 112, potentially damaging the recoater arm 112 and resulting in additional spread powder non-uniformity. Accordingly, embodiments of the present invention can detect the non-uniformities in the spread powder before they result in non-uniformities in the build area on the work platform 105. One of ordinary skill would recognize many variations, modifications, and alternatives.

In some embodiments, the on-axis optical sensors 109, off-axis sensors 110, contact sensors 113, and other sensors 114 can be configured to generate in-process raw sensor data. In other embodiments, the on-axis optical sensors 109, off-axis optical sensors 110, contact sensors 113, and other sensors 114 can be configured to process the data and generate reduced order sensor data.

In some embodiments, a computer 116, including a processor 118, computer readable medium 120, and an I/O interface 122, is provided and coupled to suitable system components of the additive manufacturing system in order to collect data from the various sensors. Data received by the computer 116 can include in-process raw sensor data and/or reduced order sensor data. The processor 118 can use in-process raw sensor data and/or reduced order sensor data to determine laser 100 power and control information, including coordinates in relation to the work platform 105. In other embodiments, the computer 116, including the processor 118, computer readable medium 120, and an I/O interface 122, can provide for control of the various system components. The computer 116 can send, receive, and monitor control information associated with the laser 100, the work platform 105, and the recoater arm 112 in order to control and adjust the respective process parameters for each component.

The processor 118 can be used to perform calculations using the data collected by the various sensors to generate in process quality metrics. In some embodiments, data generated by on-axis optical sensors 109, and/or the off-axis sensors 110 can be used to determine the thermal energy density during the build process. Control information associated with movement of the energy source across the build plane can be received by the processor. The processor can then use the control information to correlate data from on-axis optical sensor(s) 109 and/or off-axis optical sensor(s) 110 with a corresponding location. This correlated data can then be combined to calculate thermal energy density. In some embodiments, the thermal energy density and/or other metrics can be used by the processor 118 to generate control signals for process parameters, for example, laser power, laser speed, hatch spacing, and other process parameters in response to the thermal energy density or other metrics falling outside of desired ranges. In this way, a problem that might otherwise ruin a production part can be ameliorated. In embodiments where multiple parts are being generated at once, prompt corrections to the process parameters in response to metrics falling outside desired ranges can prevent adjacent parts from receiving too much or too little energy from the energy source.

In some embodiments, the I/O interface 122 can be configured to transmit data collected to a remote location. The I/O interface can be configured to receive data from a remote location. The data received can include baseline datasets, historical data, post-process inspection data, and classifier data. The remote computing system can calculate in-process quality metrics using the data transmitted by the additive manufacturing system. The remote computing system can transmit information to the I/O interface 122 in response to particular in-process quality metrics.

Figure 1B:
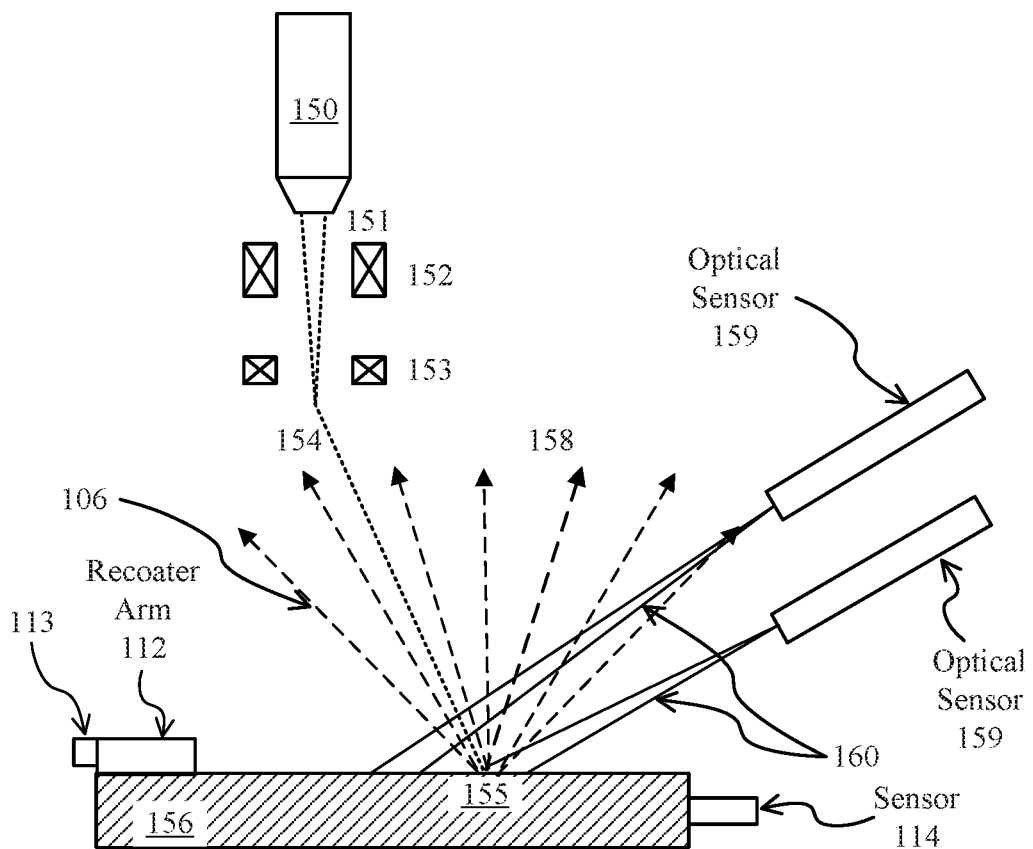
FIG. 1B is a schematic illustration of an optical sensing apparatus used in an additive manufacturing system with an energy source, in this specific instance taken to be an electron beam.

In the case of an electron beam system, FIG. 1B shows possible configurations and arrangements of sensors. The electron beam gun 150 generates an electron beam 151 that is focused by the electromagnetic focusing system 152 and is then deflected by the electromagnetic deflection system 153 resulting in a finely focused and targeted electron beam 154. The electron beam 154 creates a hot beam-material interaction zone 155 on the workpiece 156. Optical energy 158 is radiated from workpiece 156 which could be collected by a series of optical sensors 159, each with their own respective field of view 160 which, again, could be locally isolated to the interaction region 155 or could encompass the entire workpiece 156. Additionally, optical sensors 159 could have their own tracking and scanning system which could follow the electron beam 154 as it moves across the workpiece 156.

Whether or not sensors 159 have optical tracking, the sensors 159 could consist of pyrometers, photodiodes, spectrometers, and high or low speed cameras operating in the visible, UV, or IR spectral regions. The sensors 159 could also be sensors which combine a series of physical measurement modalities such as a laser ultrasonic sensor which could actively excite or "ping" the deposit with one laser beam and then use a laser interferometer to measure the resultant ultrasonic waves or "ringing" of the structure in order to measure or predict mechanical properties or mechanical integrity of the deposit as it is being built. Additionally, there could be contact sensors 113 on the recoater arm. These sensors could be accelerometers, vibration sensors, etc. Lastly, there could be other types of sensors 114. These could include contact sensors such as thermocouples to measure macro thermal fields or could include acoustic emission sensors which could detect cracking and other metallurgical phenomena occurring in the deposit as it is being built. In some embodiments, one or more thermocouples could be used to calibrate temperature data gathered by sensors 159. It should be noted that the sensors described in conjunction with FIGS. 1A and 1B can be used in the described ways to characterize performance of any additive manufacturing process involving sequential material buildup.

Figure 2:
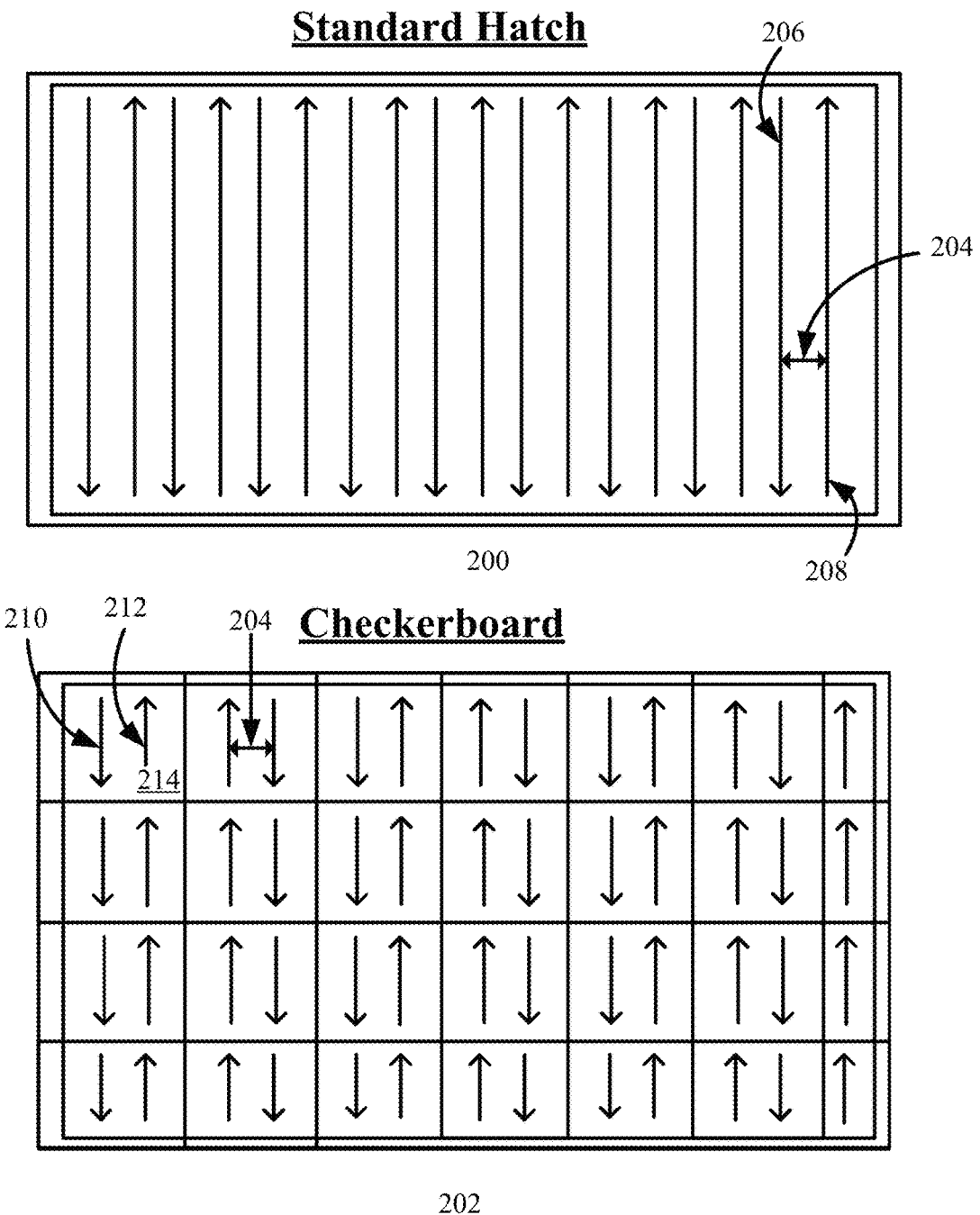
FIG. 2 shows sample scan patterns used in additive manufacturing processes.

FIG. 2 illustrates possible hatch patterns for scanning an energy source across a powder bed. In 200, a region of the workpiece is processed by the energy source scanning along long path lengths that alternate in direction. In this embodiment, hatch spacing 204 is shown between a first scan 206 and a second scan 208. In 202, a region of the workpiece is broken into smaller checkerboards 214 which can be scanned by a first scan 210 and a second scan 212 sequentially left to right and top to bottom. In other embodiments, the scan order for the individual checkerboards can be randomized. A number of hatch patterns can be utilized in conjunction with the additive manufacturing process disclosed herein. One of ordinary skill in the art would recognize many variations, modifications, and alternatives.

Figure 3:
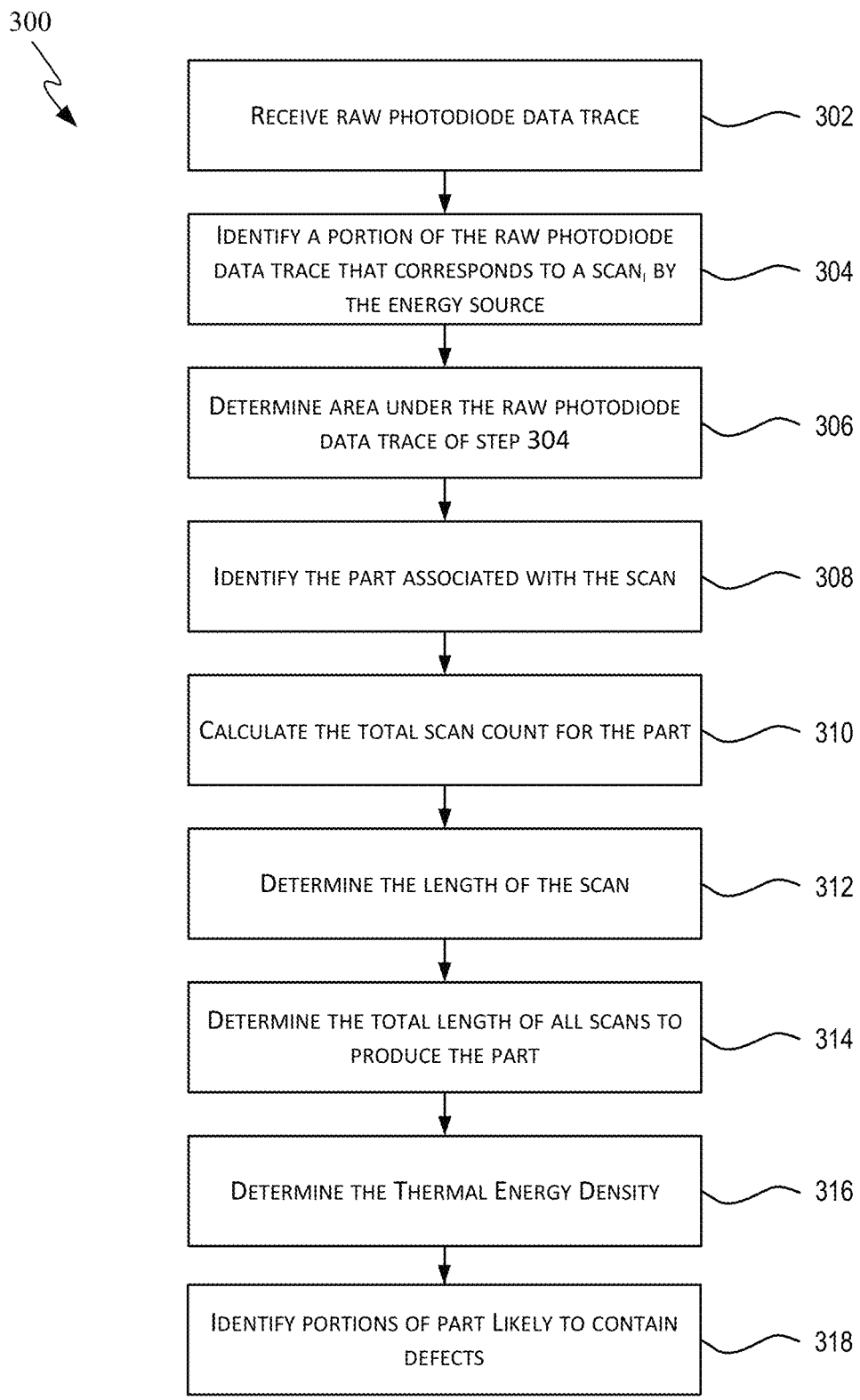
FIG. 3 shows a flow chart representing a method for identifying portions of the part most likely to contain manufacturing defects.

FIG. 3 shows a flowchart that illustrates an exemplary process 300 that uses data generated by an additive manufacturing system to determine a thermal energy density and identify portions of a part most likely to contain manufacturing defects. Data generated by the on-axis optical sensors 109 and the off-axis optical sensors 110 can be used alone or in combination to determine the thermal energy density. At 302, a raw photodiode data trace is received. The raw photodiode data trace can be generated using, for example, voltage data generated by the sensor in response to detection of emitted heat energy. At 304, a portion of the raw photodiode trace that corresponds to a particular scan, $scan_i$, is identified. In some embodiments, the individual photodiode data trace can be separated from the rest of the sensor readings by referencing energy source drive signal data (drive signal responsible for maneuvering and actuating the energy source). At 306, determine the area under the raw photodiode data trace for $scan_i$, hereinafter, $pdon_i$. In some embodiments, $pdon_i$ can represent the integrated photodiode voltage. In some embodiments, $pdon_i$ represents the average reading of the photodiode during $scan_i$. At 308, identify the part, p, associated with $scan_i$. The part identified at 308 can also have an associated area of the part, $A_p$. These two values can be determined by correlating $pdon_i$ with energy source location data as described above. The process can, at 310, calculate the total scan count. At 312 a length associated with $scam_i$, $L_i$ can be determined. $L_i$ can be calculated using equation (1), where $x1_i$, $y1_i$, and $x2_i$, $y2_i$ represent respective beginning and end locations for $scan_i$:

$$L_i = \sqrt{(x1_i - x2_i)^2 + (y1_i - y2_i)^2} \qquad \text{Eq(1)}$$

At 314, the total length of all scans used to produce the part, $Lsum_p$, can be determined. The $Lsum_p$ over the part can be determined by summing the length of each scan, $L_i$, associated with the part. At 316, the prorated area of the scan, $A_i$, can be determined. $A_i$ can be calculated using equation (2):

$$A_i = \frac{(A_p * L_i)}{Lsum_p} \qquad \text{Eq (2)}$$

At 316, the prorated thermal energy density (TED) for the $i^{th}$ scan, $TED_i$, can be determined. $TED_i$ is an example of a set of reduced order process features. The TED is calculated using raw photodiode data. From this raw sensor data, the TED calculation extracts reduced order process features from the raw sensor data. $TED_i$ is sensitive to all user defined laser powder bed fusion process parameters, for example laser power, laser speed, hatch spacing, and many more. $TED_i$ can be calculated using equation (3):

$$TED_i = \frac{pdon_i}{A_i} \qquad \text{Eq (3)}$$

For the purposes of this discussion "reduced order" refers to one or more of the following aspects: data compression, i.e., less data in the features as compared to the raw data; data reduction, i.e. a systematic analysis of the raw data which yields process metrics or other figures of merit; data aggregation, i.e. the clustering of data into discrete groupings and a smaller set of variables that characterize the clustering as opposed to the raw data itself; data transformation, i.e. the mathematical manipulation of data to linearly or non-linearly map the raw data into another variable space of lower dimensionality using a transformation law or algorithm; or any other related such techniques which will have the net effect of reducing data density, reducing data dimensionality, reducing data size, transforming data into another reduced space, or all of these either effected simultaneously.

$TED_i$ can be used for analysis during in process quality metric (IPQM) comparison to a baseline dataset. A resulting IPQM can be calculated for every scan. At 318, the IPQM quality baseline data set and the calculated $TED_i$ can be compared. In regions of the part where a difference between the calculated TED and baseline data set exceeds a threshold value, those regions can be identified as possibly including one or more defects and/or further processing can be performed on the region in near real-time to ameliorate any defects caused by the variation of TED from the baseline data set. In some embodiments, the portions of the part that may contain defects can be identified using a classifier. The classifier is capable of grouping the results as being either nominal or off-nominal and could be represented through graphical and/or text-based mediums. The classifier could use multiple classification methods including, but not limited to: statistical classification, both single and multivariable; heuristic based classifiers; expert system based classifiers; lookup table based classifiers; classifiers based simply on upper or lower control limits; classifiers which work in conjunction with one or more statistical distributions which could establish nominal versus off-nominal thresholds based on confidence intervals and/or a consideration of the degrees of freedom; or any other classification scheme whether implicit or explicit which is capable of discerning whether a set of feature data is nominal or off-nominal. For the purposes of this discussion, "nominal" will mean a set of process outcomes which were within a pre-defined specification, which result in post-process measured attributes of the parts thus manufactured falling within a regime of values which are deemed acceptable, or any other quantitative, semi-quantitative, objective, or subjective methodology for establishing an "acceptable" component. Additional description related to classification of IPQMs is provided in U.S. patent application Ser. No. 15/282,822, filed on Sep. 30, 2016, the disclosure of which is hereby incorporated by reference in its entirety for all purposes.

It should be appreciated that the specific steps illustrated in FIG. 3 provide a particular method of collecting data and determining the thermal energy density according to an embodiment of the present invention. Other sequences of steps may also be performed according to alternative embodiments. Moreover, the individual steps illustrated in FIG. 3 may include multiple substeps that may be performed in various sequences as appropriate to the individual step. Furthermore, additional steps may be added or existing steps may be removed depending on the particular applications. One of ordinary skill in the art would recognize many variations, modifications, and alternatives.

Figure 4A:
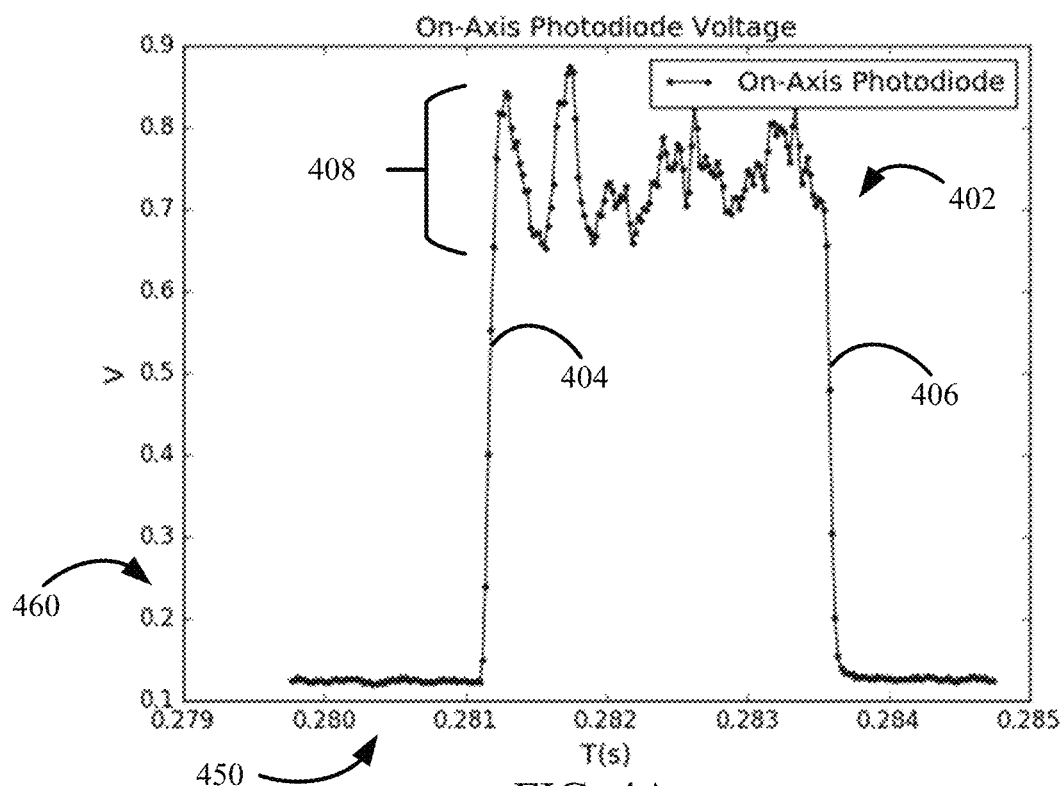
FIGS. 4A-4H show the data associated with the step by step process to identify a portion of the part most likely to contain a manufacturing defect using the thermal energy density.

FIGS. 4A-4H illustrate the steps used in the process 300 to determine the TED and identify any portions of the part likely to contain defects. FIG. 4A corresponds to step 302 and shows a raw photodiode signal 402 for a given scan length. The x-axis 450 indicates time in seconds and the y-axis 460 indicates the photodiode voltage. In some embodiments, optical measurements could instead, or in addition to, be made by a pyrometer. The signal 402 is the photodiode raw voltage. The rise 404 and fall 406 of the photodiode signal 402 can be clearly seen as well as the scatter and variation 408 in the signal during the time that the laser is on. The data is collected at a given number of samples per second. The variation 408 in photodiode signal 402 can be caused by variations in powder being melted on the powder bed. For example, one of the minor troughs of photodiode signal 402 can be caused by energy being absorbed by a larger particle in the particle bed transitioning from a solid state to a liquid state. In general, the number of data points in a given segment of the photodiode signal between rise and fall events can be related to the scan duration and the sampling rate.

Figure 4B:
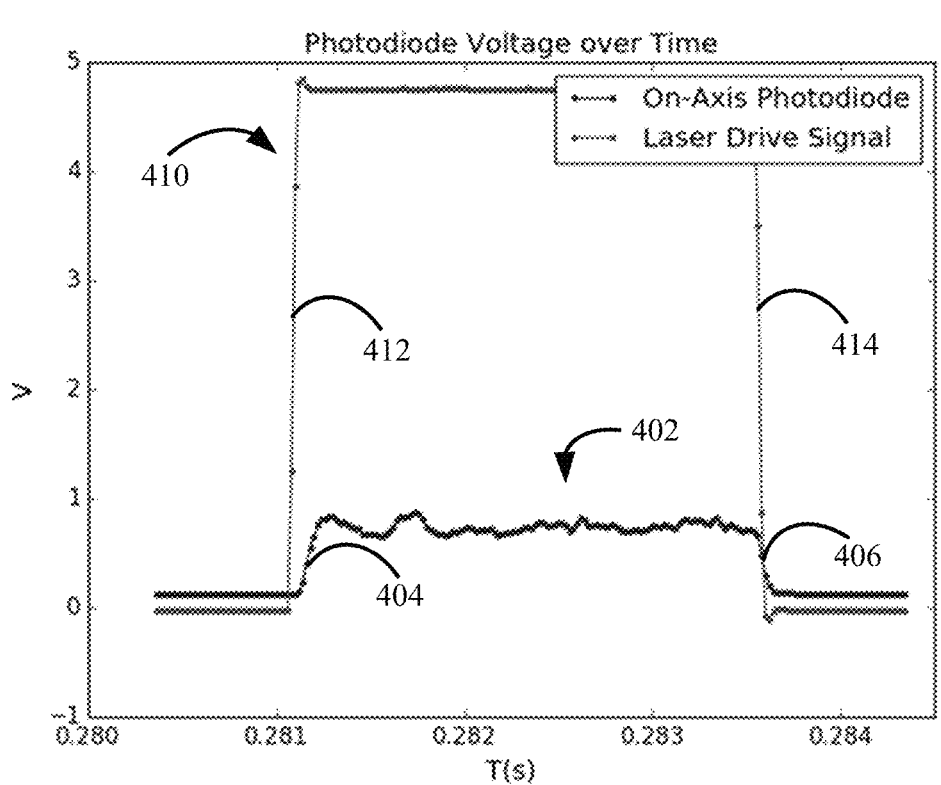

FIG. 4B shows a raw photodiode signal 402 and a laser drive signal 410. The laser drive signal 410 depicted in FIG. 4B can be produced using energy source drive signal data, in this case the laser drive signal 410, or a command signal which tells the laser to turn on and off for a specific scan length. The photodiode signal 402 is superimposed over the laser drive signal 410. The rise 412 and fall 414 of the laser drive signal 410 correspond to the rise 404 and fall 406 of the photodiode signal 402. The data illustrated in FIG. 4B can be used to at step 304 to identify a portion of the raw photodiode signal 402 that corresponds to a scan. In some embodiments, the laser drive signal 410 is ~0V when the laser is off and ~5 V when the laser is on. Step 304 can be accomplished by isolating all the data associated with the photodiode signal where the laser drive signal 410 is above a certain threshold, for example, 4.5V, and exclude all data where the laser is below this threshold from analysis.

Figure 4C:
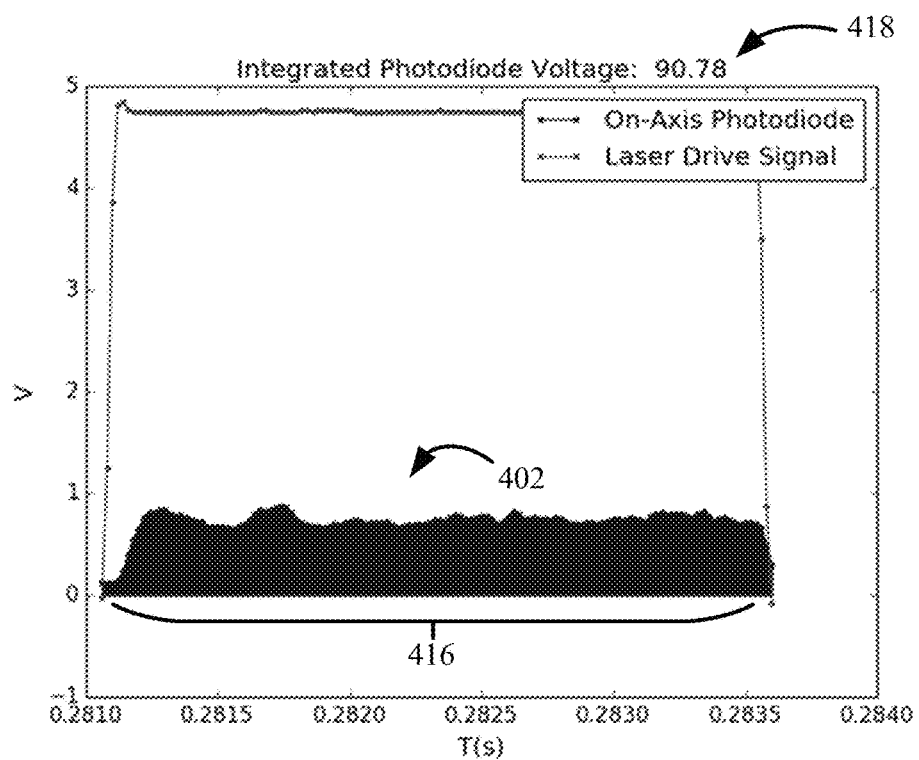

FIG. 4C shows one embodiment of step 306, which includes determining the area 416 under the raw photodiode signal 402. In some embodiments, the area under the curve can be calculated using equation (4):

$$pdon_i = \int_{rise}^{fall} V(t)dt \qquad \text{Eq(4)}$$

The integrated photodiode voltage 418 can be used to determine $pdon_i$ for the $TED_i$ calculation.

Figure 4D:
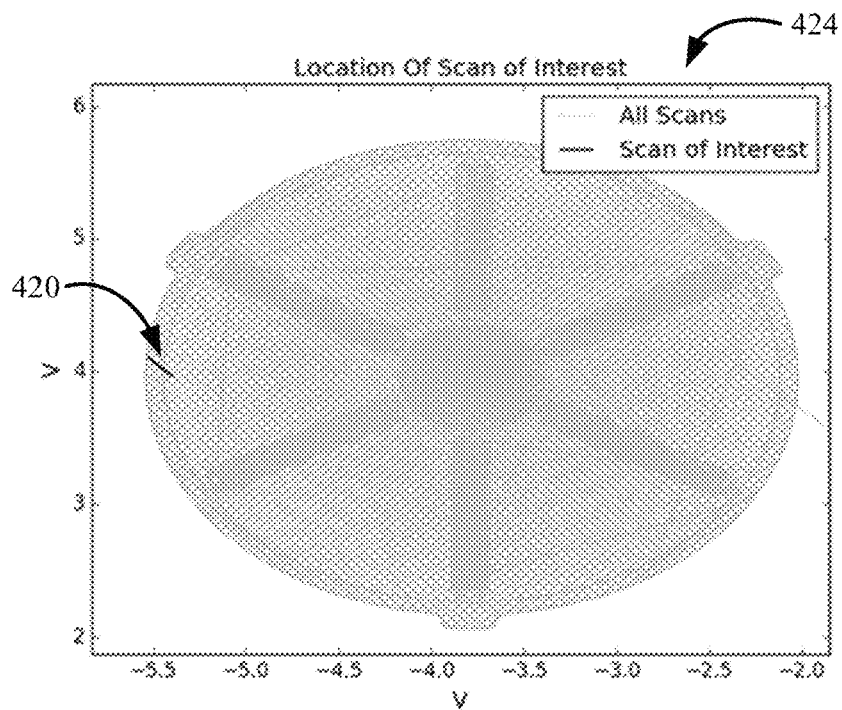
Figure 4E:
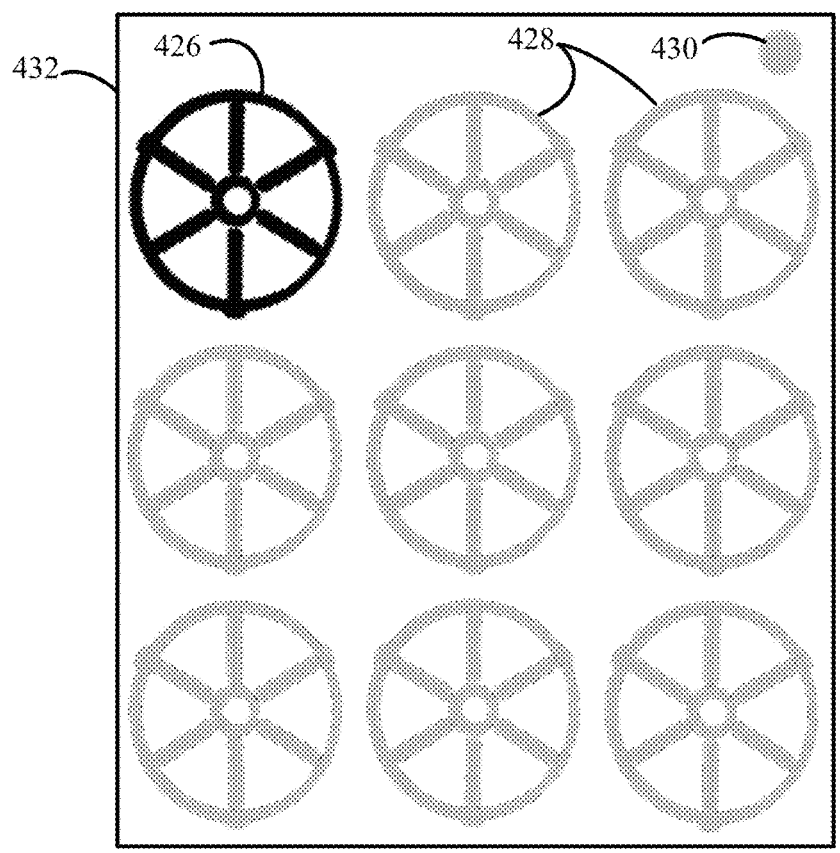

FIG. 4D shows a position of scan 420 relative to the part and the total scan count 424. Both values can be used to determine a TED that corresponds to the scan location on the part. FIG. 4E shows the render area for a part of interest 426. FIG. 4E also shows a plurality of additional parts 428 and a witness coupon 430. All of the parts in FIG. 4E are depicted positioned on a powder bed 432.

Figure 4F:
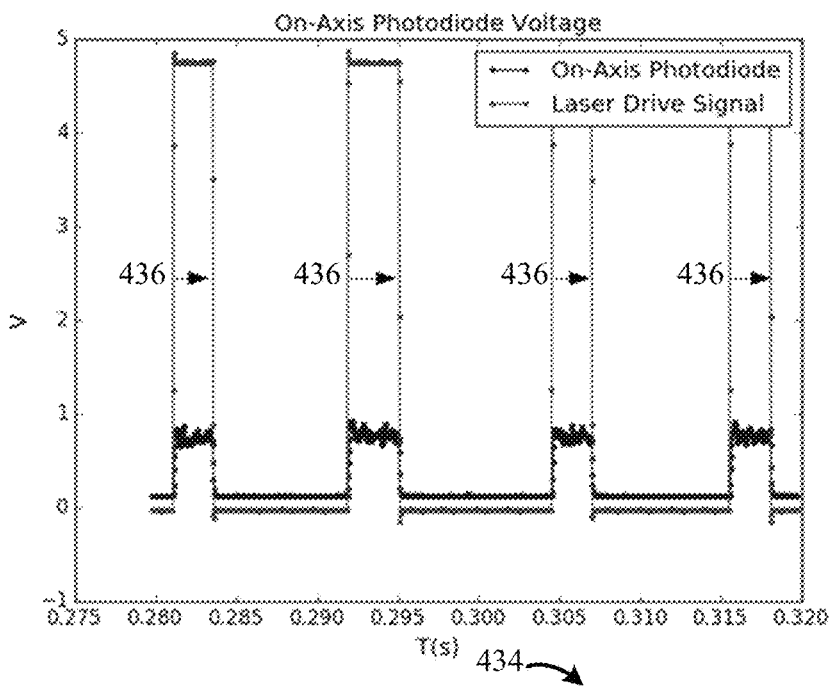

FIG. 4F shows a trace associated with a portion of the photodiode data and the laser drive signal data corresponding to four scans that can be used with the rest of the photodiode data to determine the total sample count 434. The total sample count can be used to calculate the total scan length over the part, $LSum_p$. The total sample count is determined by summing the laser-on time periods 436. In some embodiments, the total scan length can be determined using the sum of the laser on time periods and average speed of the scanning energy source during laser-on time periods.

Figure 4G:
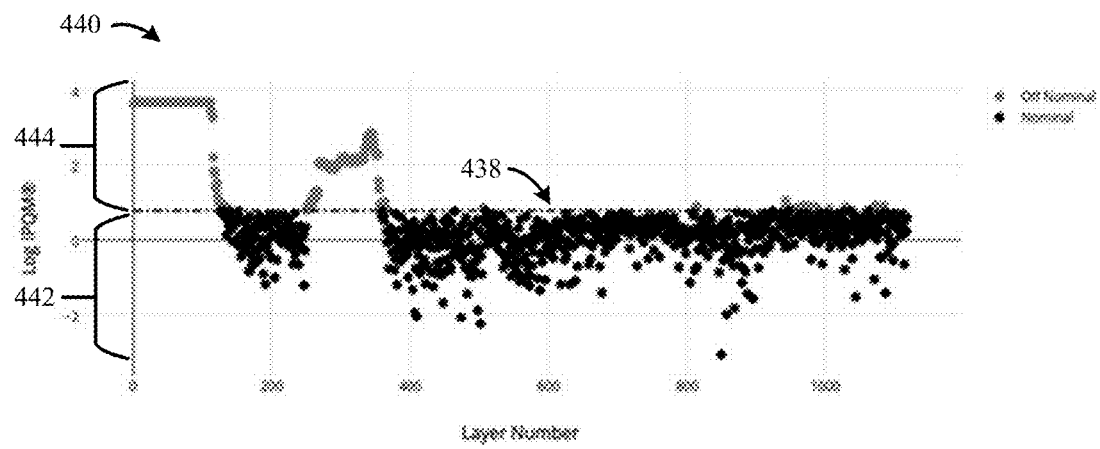

After collecting the scan data, the TED for each layer can be calculated from the TED associated with each laser scan and then displayed in a graph 440, shown in FIG. 4G. The graph 440 illustrates TED values positioned within nominal region 442 and off nominal region 444. The TED regions are divided by baseline threshold 438. In this way, layers of the part likely to contain defects are easily identifiable. Further analysis could then be focused on the layers with off-nominal TED values.

Figure 4H:
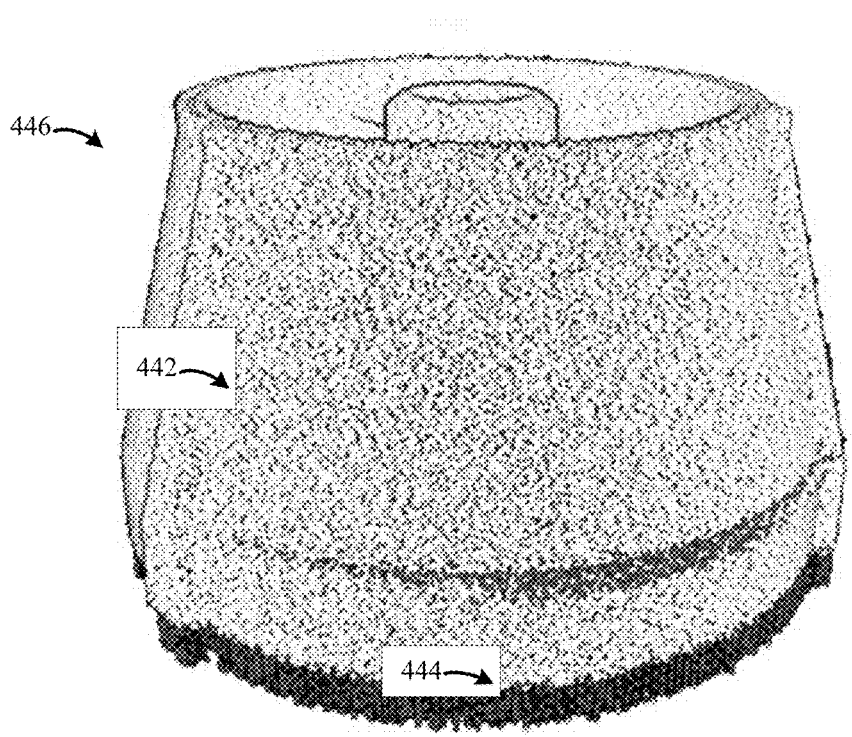

FIG. 4H shows how the TED value for each scan can be displayed in three dimensions using a point-cloud 446. Point cloud 446 illustrates the position in three-dimensional space of TED values from nominal region 442 and off nominal region 444 by displaying off nominal values as a different color or intensity than nominal values. Off nominal values are indicative of portions of the part most likely to contain manufacturing defects, such as, porosity from keyhole formation or voids resulting from a lack of fusion. In some embodiments, the system can generate and transmit a control signal that will change one or more process parameters based on the TED.

Figure 5:
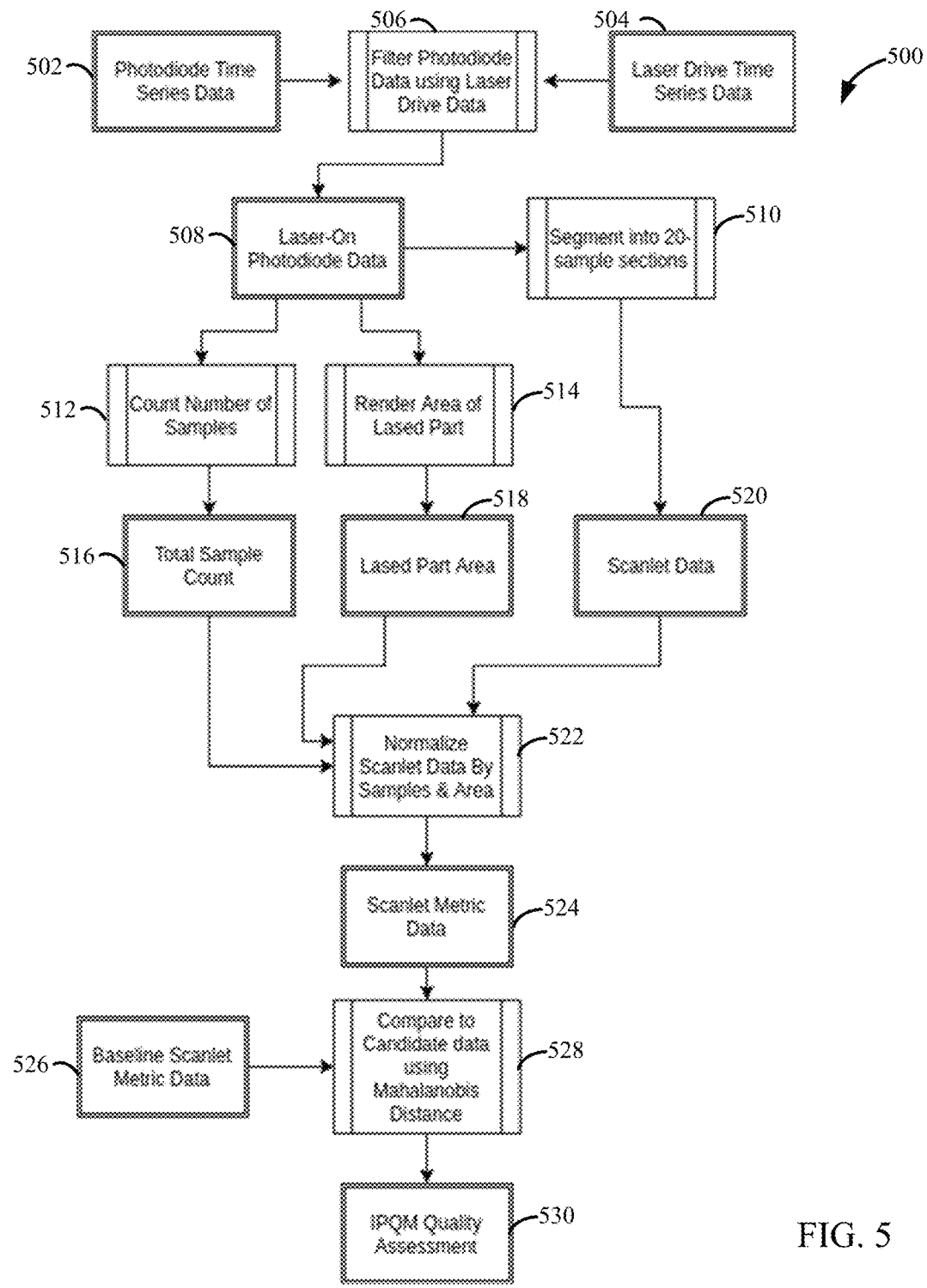
FIG. 5 shows a flow chart describing in detail how to use scanlet data segregation to complete an IPQM assessment.

FIG. 5 shows a flowchart that illustrates an exemplary process 500 that uses data generated by an additive manufacturing system to determine a thermal energy density and identify portions of a part most likely to contain manufacturing defects. Data generated by the on-axis optical sensors 109 and the off-axis optical sensors 110 can be used alone or in combination to determine the thermal energy density. At 502, photodiode time series data can be collected. The photodiode time series data can be generated using, for example, voltage data associated with the sensors. At 504, laser drive time series data is collected. The laser drive time data may be associated with additional process parameters such as, laser power, laser speed, hatch spacing, x-y position, etc. The process at 506 can slice the photodiode time series data by dropping portions of the photodiode time series data that correspond to portions of the laser drive time series data that indicate a laser-off state. In some embodiments, the laser drive signal is ~0 V when the laser is off and ~5 V when the laser is on. The process at 506 can isolate all the data where the laser drive signal is above a certain threshold, for example, 4.5 V, and exclude all data where the laser is below this threshold from analysis. In some embodiments, the photodiode signal that drops to ~0.2 V periodically can be included in the sample series data as these are times when the laser just turned on and the laser is heating the material.

The process at 506 outputs only the laser-on photodiode data 508. The laser on photodiode data can be used by the process at 510 to converts the time-series data into sample-series data. The process at 510 segments the laser on photodiode data into 'N' sample sections. The use of 20 sample sections is meant to provide an example of one embodiment of the present invention. Any number of sample sections can be used with varying degrees of accuracy/resolution. In some embodiments, the set of sample sections can be referred to as a scanlet 520 since it generally takes multiple scanlets 520 to make up a single scan. The process at 512 can count the number of samples 516. The process at 514 can render an area of the lased part. In some embodiments, the lased part area 518 can be determined using the number of pixels in a display associated with the lased part. In other embodiments, the area can be calculated using the number of scans and data associated with process parameters. At 522, a process normalizes the scanlet data using total sample count lased part area 518, and scanlet data 520. In the illustrated embodiment, the scanlet metric data 524 is the thermal energy density for portions of the part associated with each scanlet. In some embodiments, scan data can also be broken down by scan type. For example, an additive manufacturing machine can utilize scans having different characteristics. In particular, contour scans, or those designed to finish an outer surface of a part can have substantially more power than scans designed to sinter interior regions of a part. For this reason, more consistent results can be obtained by also segregating the data by scan type. In some embodiments, identification of scan types can be based on scan intensity, scan duration and/or scan location. In some embodiments, scan types can be identified by correlating the detected scans with scans dictated by a scan plan associated with the part being built.

Next, a process 528 receives baseline scanlet metric data and the thermal energy density and outputs an IPQM quality assessment 530. The IPQM quality assessment 530 can be used to identify portions of the part most likely to contain manufacturing defects. The process 528 can include a classifier as discussed earlier in the specification. In addition to the methods and systems above, the process 528 can compare the candidate data, for example the scanlet metric data 524 and the baseline scanlet metric data using a Mahalanobis distance. In some embodiments, the Mahalanobis distance for each scanlet can be can be calculated using the baseline scanlet metric data. While the embodiments disclosed in relation to FIG. 5 discussed the use of a laser as an energy source, it will be apparent to one of ordinary skill in the art that many modifications and variations are possible in view of the above teachings, for example, the laser may be replaced with an electron beam or other suitable energy source.

It should be appreciated that the specific steps illustrated in FIG. 5 provide a particular method of determining a thermal energy density and identifying portions of a part most likely to contain manufacturing defects according to another embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6A:
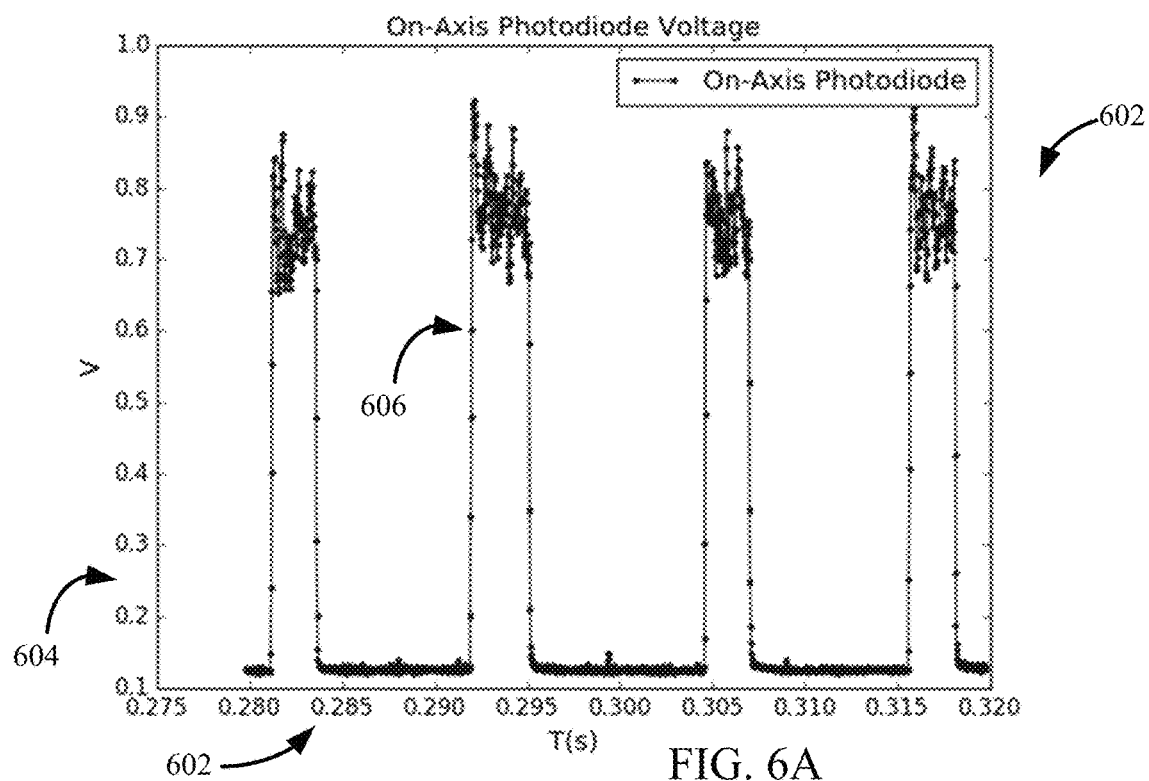
FIGS. 6A-6F show the data associated with the step by step process to identify a portion of the part most likely to contain a manufacturing defect using the thermal energy density.

FIG. 6A shows photodiode time series data 602. The photo diode time series data can be collected from a variety of on-axis or off-axis sensors as illustrated in FIGS. 1 and 2. The x-axis 604 indicates time in seconds and the y-axis 606 indicates voltage generated by the sensor. The voltage generated by the sensor is associated with energy emitted from the build plane that can impinge on one or more sensors. The samples 606 are illustrated on the trace of the photodiode time series data 602. FIG. 4B describes the process at 506 where the photodiode data is associated with the laser drive signal.

Figure 6B:
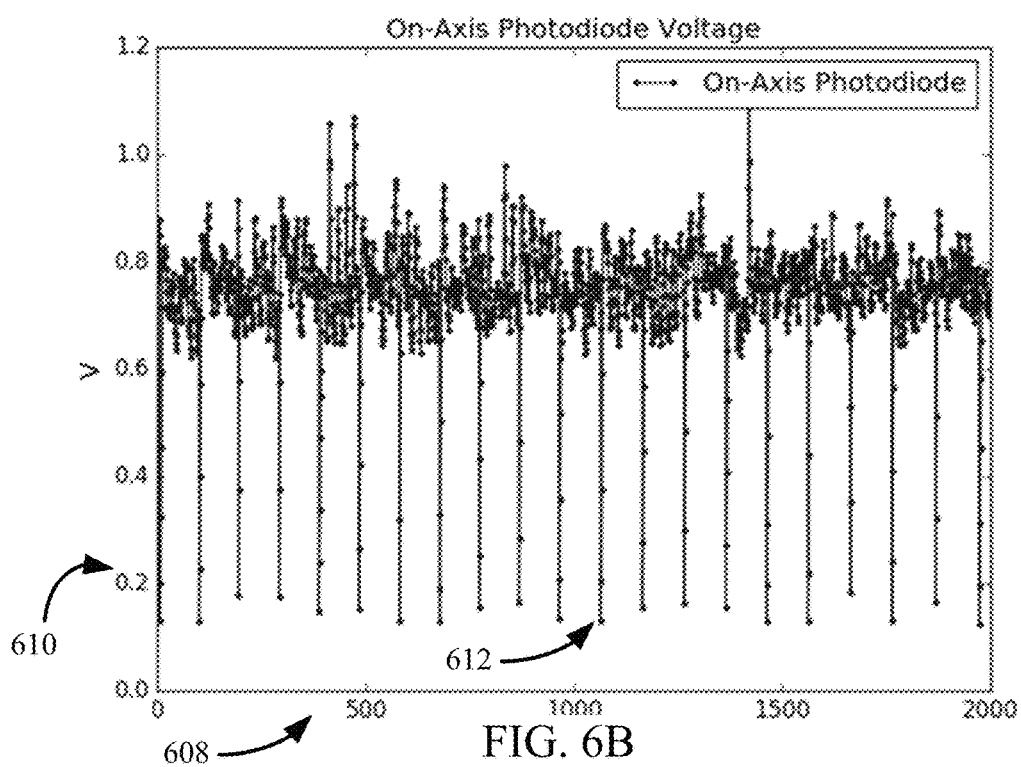

FIG. 6B shows the laser on photodiode data. The x-axis represents the number of samples 608 and the y-axis 610 represents the voltage of the raw sensor data. The drops 612 in voltage are included in the analysis because, while the voltage is substantially lower, the laser is still actively contributing to heating the material.

Figure 6C:
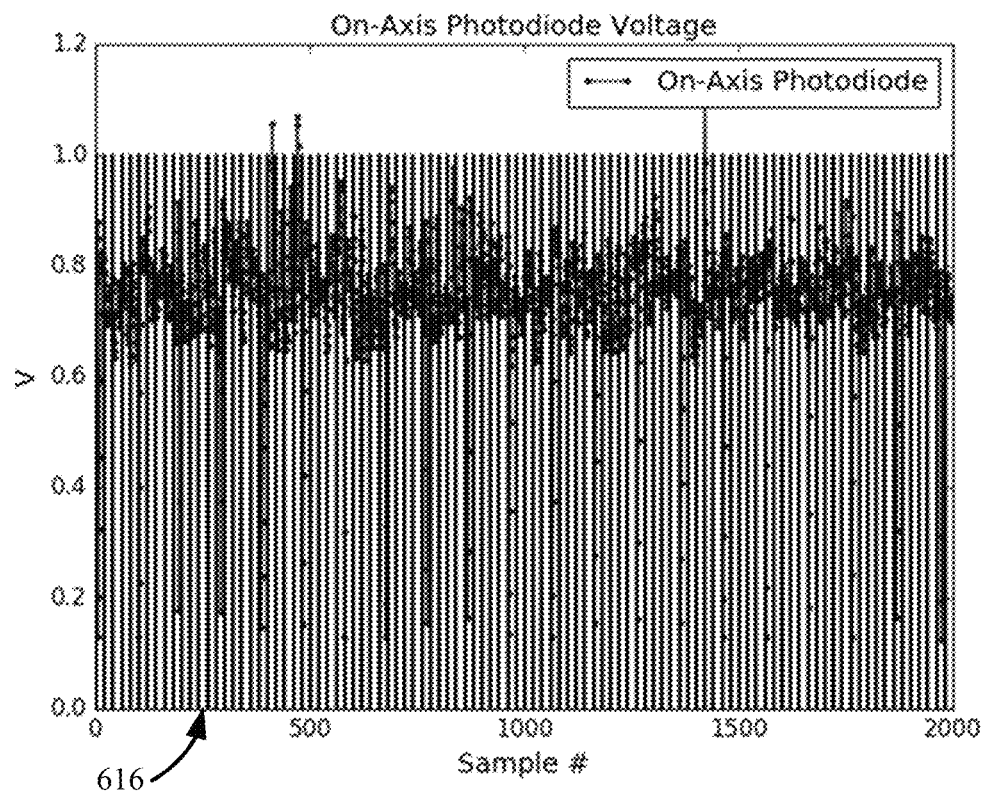

FIG. 6C shows the laser on photodiode sample series data discussed in relation to step 510. The 20-sample sections 620 can have an arbitrary size. Twenty samples corresponds to a laser travel distance of ~400 μm with a laser travel speed of 1000 mm/s. The noise in the XY signal itself is ~150 μm. In some embodiments, with less than a 20-sample section, for example, a 2 sample-section, the distance measured and the noise would be in such a ratio that the location of a point could not confidently be determined. In some embodiments, a limit of 50 samples can be used for spatial resolution below 1 mm. Thus, the number of samples to segment the data into should be in the range of 20≤N≤50, for 50 KHz data with a laser travel speed of 1000 mm/s. It will be apparent to one of ordinary skill in the art that many modifications and variations are possible in view of the above teachings.

Figure 6D:
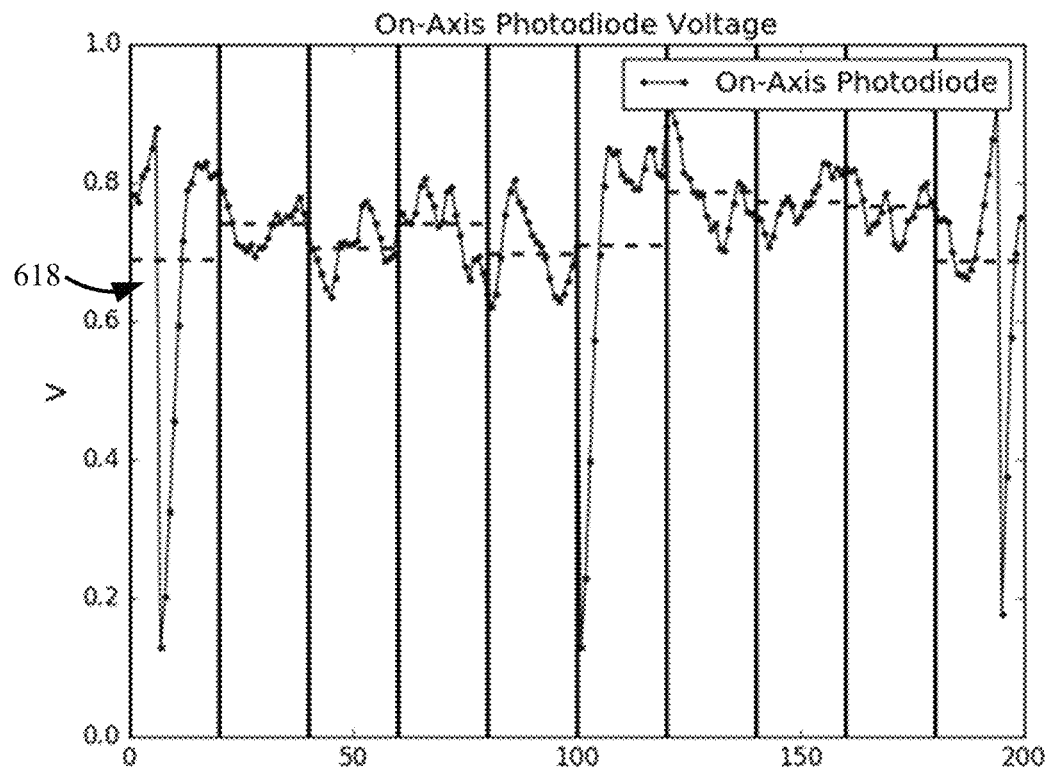

FIG. 6D corresponds to process 522 and illustrates an embodiment where the average value 618 of each scanlet is determined. In some embodiments, the inputs into process 522 include the total sample count 516, the lased part area 518, and the scanlet data 520. Using these inputs, the average can be used to determine the area under the curve (AUC) as illustrated in equation (5):

$$AUC = V(avg) * N(samples) \quad \text{Eq(5)}$$

Where V is the average voltage determined for each scanlet and N is the number of samples. In FIG. 6D, the average voltage of the 20-sample segment is equivalent to integrating the signal because the width of the data is fixed.

Figure 6E:
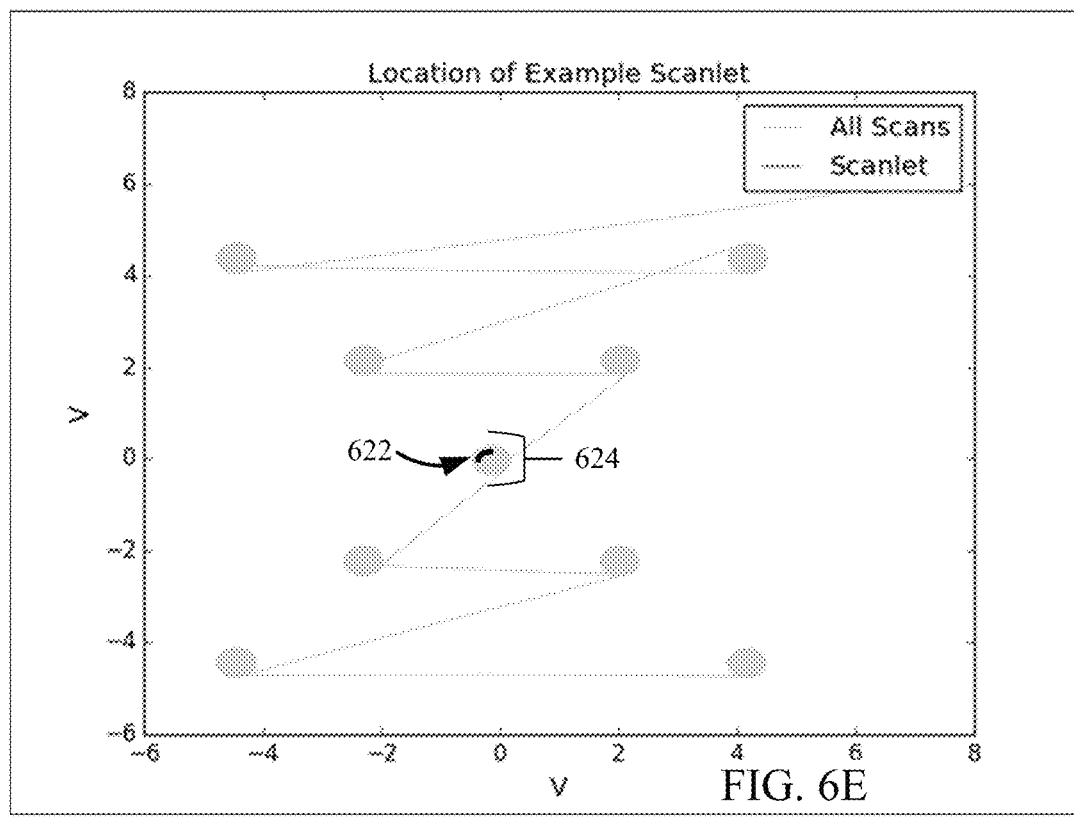

FIG. 6E shows the lased part area for an individual scanlet 622, $A_i$, and for all scans 624. In addition to the area, the length of a scan, $L_i$, and the sum of $L_i$ over the entire part can be calculated, $LSum_p$. $L_i$ can be calculated using equation (6):

$$L_i = \sqrt{(x1_i - x2_i)^2 + (y1_i - y2_i)^2} \quad \text{Eq(6)}$$

The x and y coordinates for the beginning and end of the scan may be provided or they may be determined based on one or more direct sensor measurements.

Figure 6F:
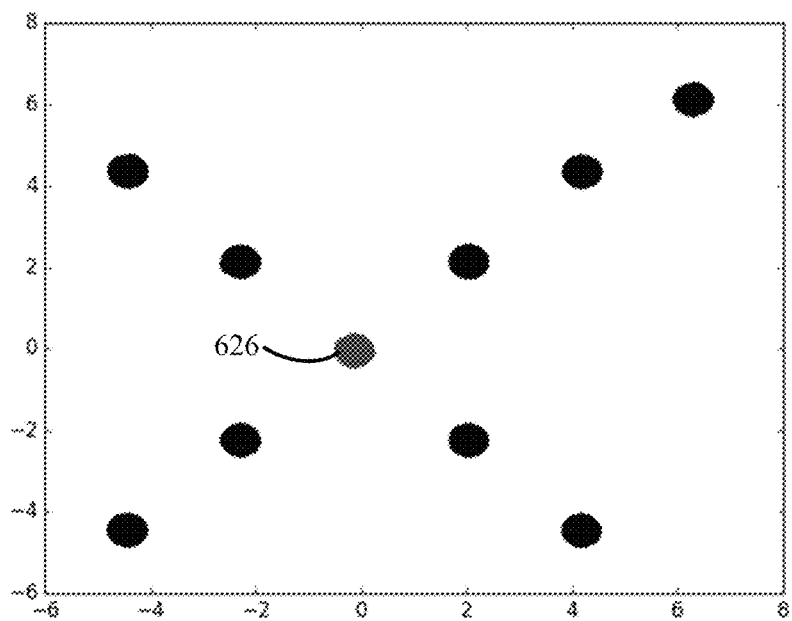

FIG. 6F shows the render area 626 of a lased part associated with a layer in the build plane. In some embodiments, once $pdon_i$, the area of the part, $A_p$, the length of the scan, $L_i$, and the total length $LSum_p$ are determined, TED can be calculated using equation (7):

$$TED_i = \frac{(pdon_i * LSum_p)}{(A_p * L_i)} \quad \text{Eq (7)}$$

TED is sensitive to all user-defined laser powder bed fusion process parameters, for example, laser power, laser speed, hatch spacing, etc. The TED value can be used for analysis using an IPQM comparison to a baseline dataset. The resulting IPQM can be determined for every laser scan and displayed in a graph or in three dimensions using a point-cloud. FIG. 4G shows an exemplary graph. FIG. 4H shows an exemplary point cloud.

Figure 7A:
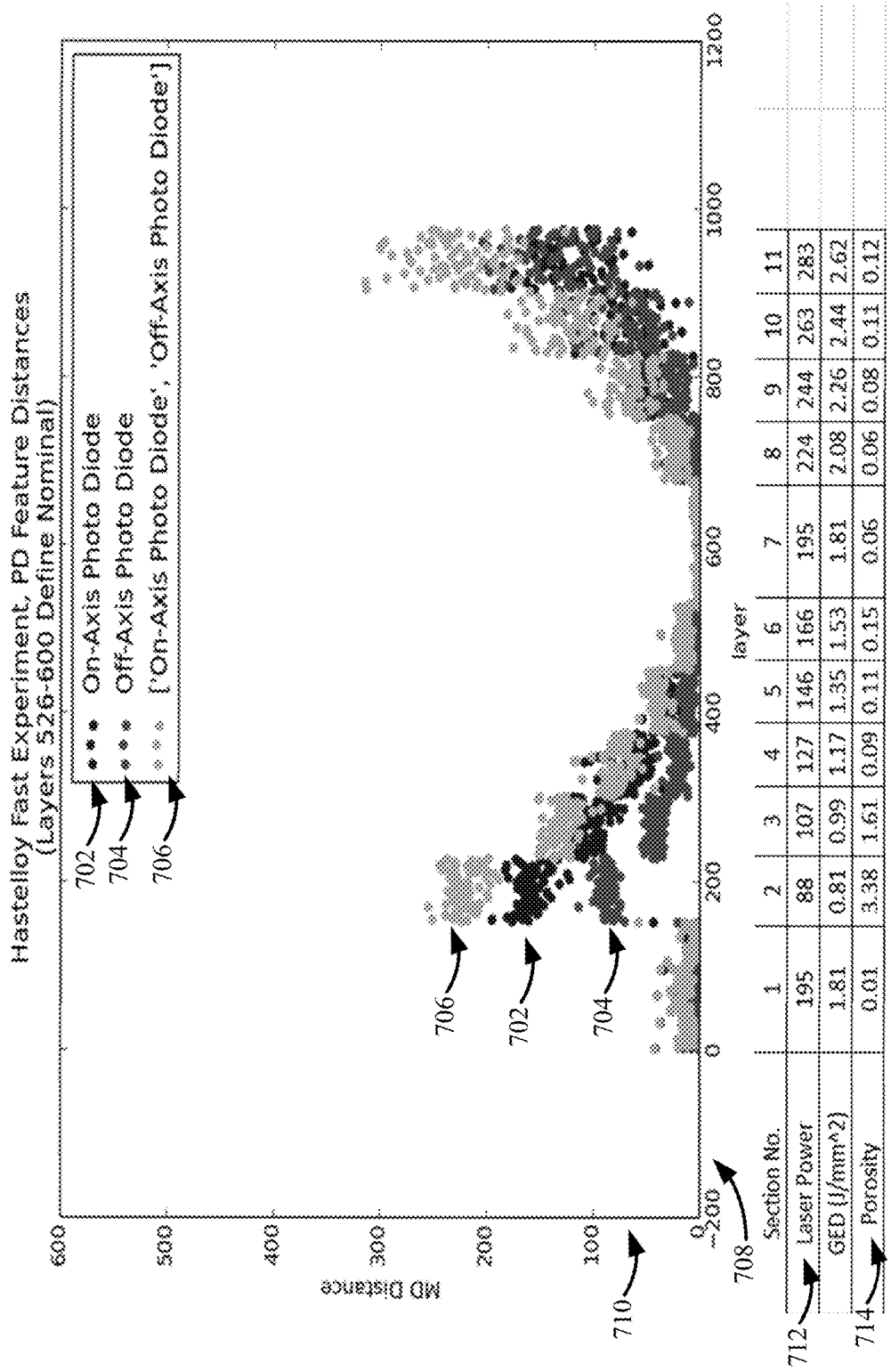
FIGS. 7A-7C show test results comparing IPQM metrics to post process metallography.
Figure 7B:
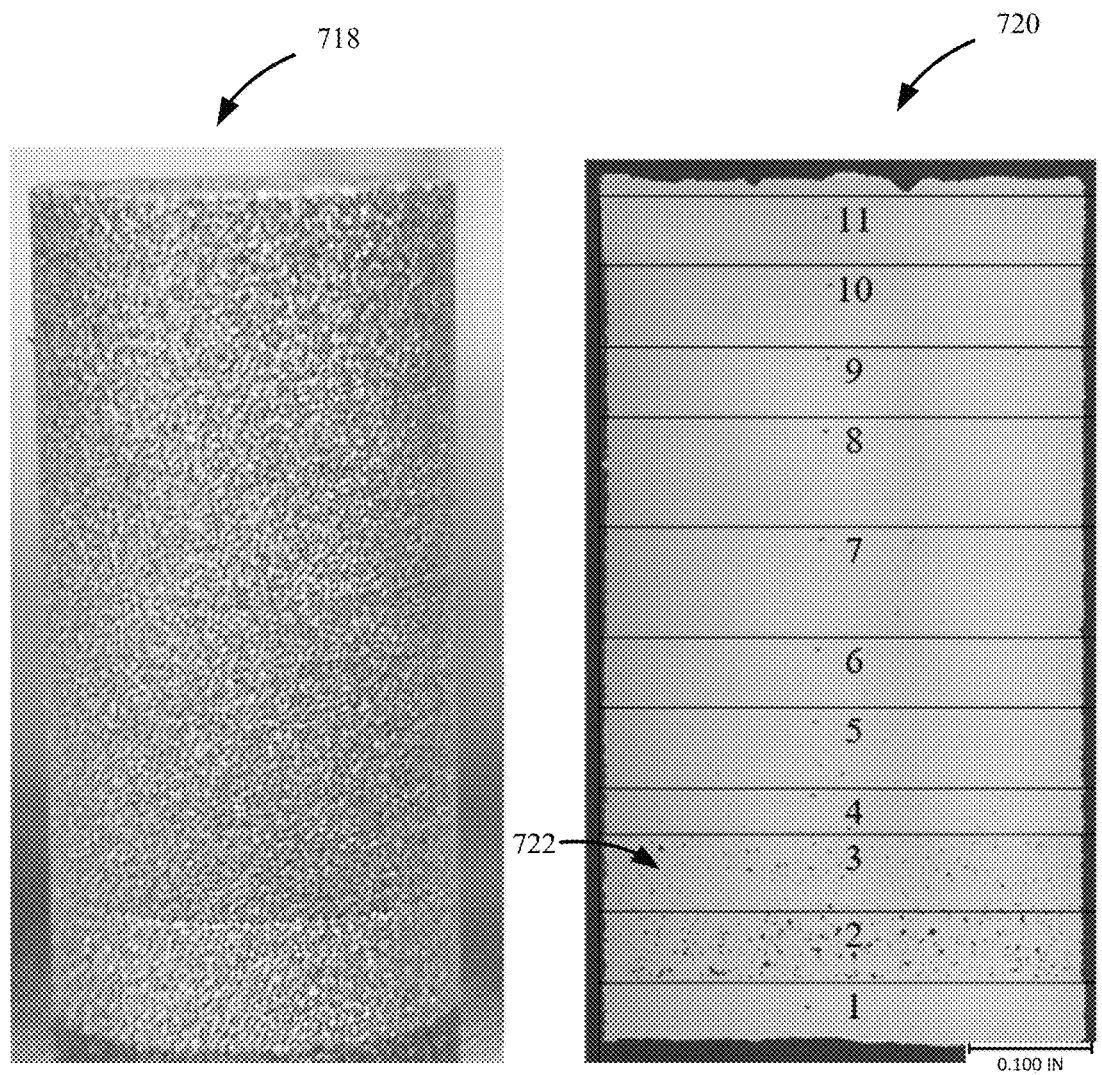
Figure 7C:
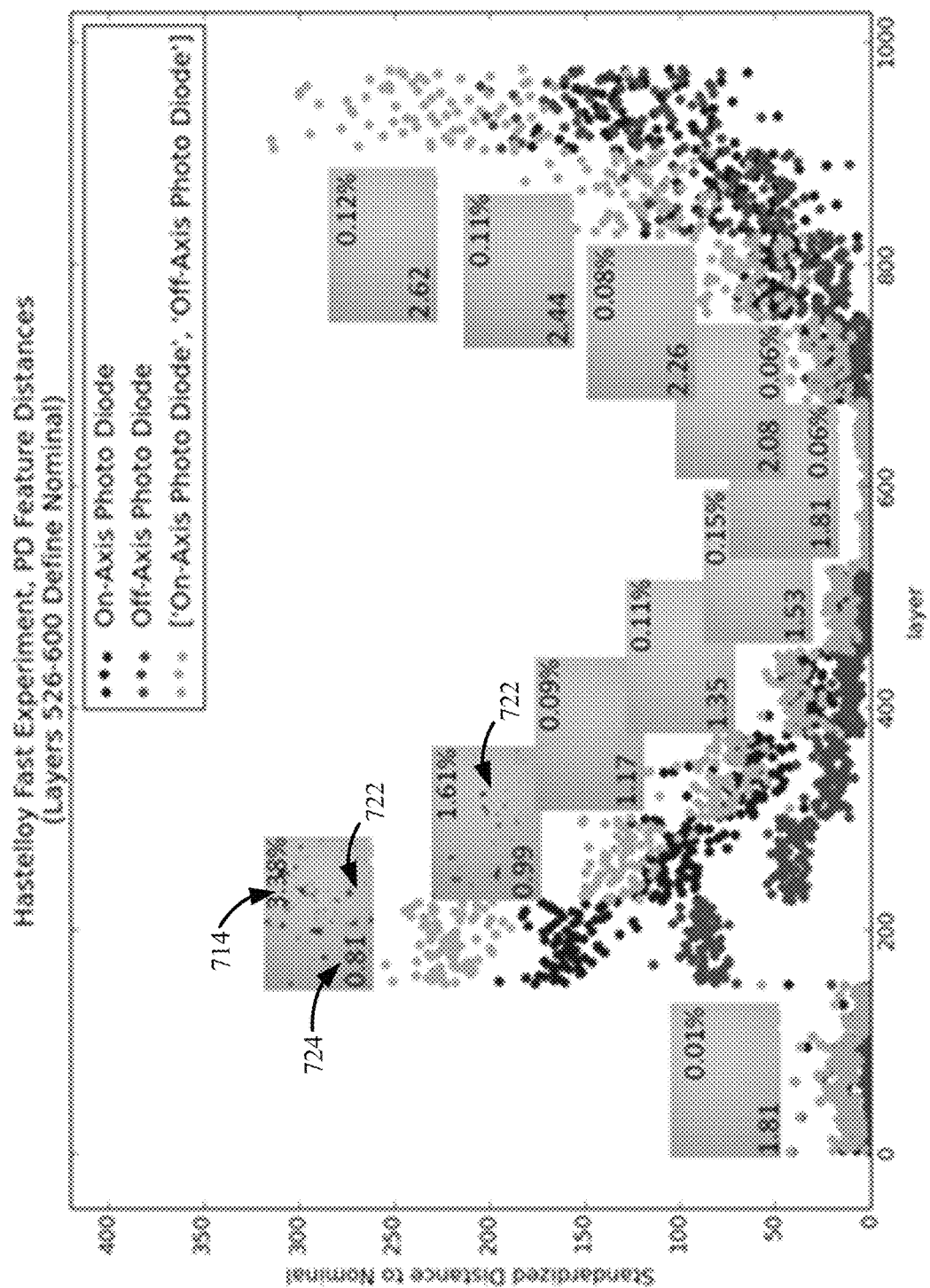

FIGS. 7A-7C show post process porosity measurements and corresponding normalized in-process TED measurements. The figures show that in-process TED measurements can be an accurate IPQM predictor of porosity and other manufacturing defects. FIG. 7A shows the comparison of TED metric data to a baseline dataset. The plot shows the value of each photodiode in the IPQM metric, both separate and combined. On-axis photodiode data 702 can come from sensors aligned with the energy source. Off-axis photodiode data 704 can be collected by sensors that are not aligned with the energy source. The combination of on-axis and off-axis photodiode data 706 yields the highest sensitivity to changes in process parameters. The x-axis 708 shows the build plane layer of the part; the y-axis 710 shows the Mahalanobis distance between the calculated TED and the baseline metric.

The Mahalanobis distance can be used to standardize the TED data. The Mahalanobis distance indicates how many standard deviations each TED measurement is from a nominal distribution of TED measurements. In this case, the Mahalanobis Distance indicates how many standard deviations away each TED measurement is from the mean TED measurement collected while building control layers 526-600. The chart below FIG. 7A also shows how TED varies with global energy density (GED) and porosity. In particular, for this set of experiments TED can be configured to predict part porosity without the need to do destructive examination.

In some embodiments, the performance of the additive manufacturing device can be further verified by comparing quantitative metallographic features (e.g. the size and shape of pores or intermetallic particles) and/or mechanical property features (e.g. strength, toughness or fatigue) of the metal parts created while performing the test runs. In general, the presence of unfused metal powder particles in the test parts indicates not enough energy was applied while test parts that received too much energy tend to develop internal cavities that can both compromise the integrity of the created part. Porosity 714 can be representative of these defects.

In some embodiments, a nominal value used to generate FIG. 7A will be taken from a preceding test. In some embodiments, the nominal value could also be taken from a subsequent test since the calculations do not need to be done during the additive manufacturing operation. For example, when attempting to compare performance of two additive manufacturing devices, a nominal value can be identified by running a test using a first one of the additive manufacturing devices. The performance of the second additive manufacturing device could then be compared to the nominal values defined by the first additive manufacturing device. In some embodiments, where performance of the two additive manufacturing devices is within a predetermined threshold of five standard deviations, comparable performance can be expected from the two machines. In some embodiments, the predetermined threshold can be a 95% statistical confidence level derived from an inverse chi squared distribution. This type of test methodology can also be utilized in identifying performance changes over time. For example, after calibrating a machine, results of a test pattern can be recorded. After a certain number of manufacturing operations are performed by the device, the additive manufacturing device can be performed again. The initial test pattern performed right after calibration can be used as a baseline to identify any changes in the performance of the additive manufacturing device over time. In some embodiments, settings of the additive manufacturing device can be adjusted to bring the additive manufacturing device back to its post-calibration performance.

FIG. 7B shows the post process metallography for a part constructed using an additive manufacturing process. FIG. 7B shows the part 718 and a corresponding cross-section 720 of the part. The sections 1 through 11 correspond to sections 1 through 11 in FIG. 7A. The changes in process parameters, and the resulting changes in porosity, can be seen in the cross-section view 720 of the part. In particular, sections 2 and 3 have the highest porosity, 3.38% and 1.62% respectively. The higher porosity is shown in the cross-section by the increased number of defect marks 722 in the sample part.

FIG. 7C shows the IPQM results with the corresponding cross-section determined during metallography. Each cross-section includes the energy density 724 in J/mm$^2$ and the porosity 714. The samples with the highest number of defect marks 722 correspond to the TED measurements with the highest standardized distances from the baseline. The plot illustrates that low standardized distance can be predictive of higher density and low porosity metallography while a high standardized Malahabonis distance is highly correlated with high-porosity and poor metallography. For example, low power settings used in generating layers around layer 200 result in a high porosity 714 and a large number of defect marks 722. In comparison, using middle of the road settings on or around the 600$^{th}$ layer results in no identifiable defect marks 722 and the lowest recorded porosity value of 0.06%.

Figure 8:
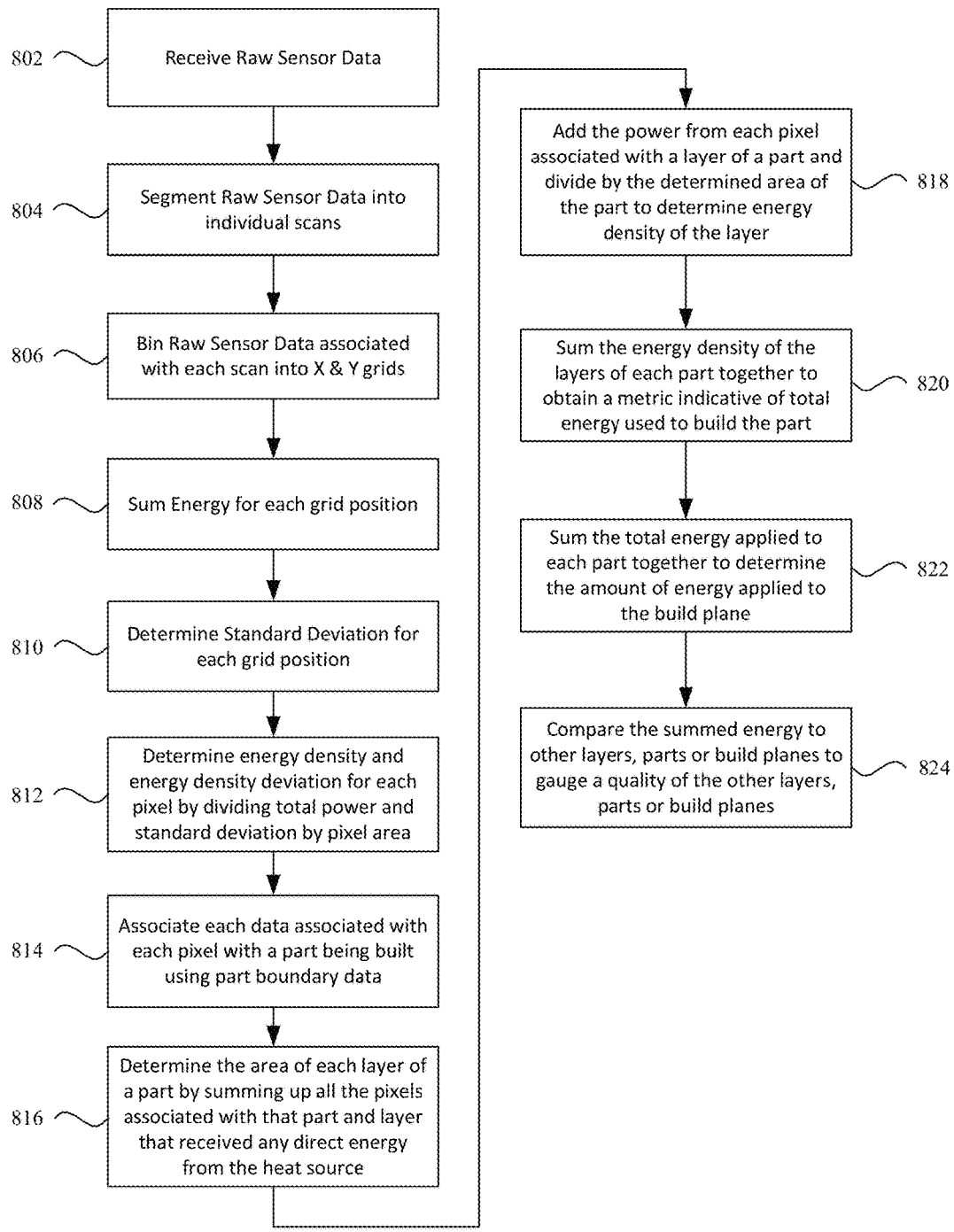
FIG. 8 shows an alternative process in which data recorded by an optical sensor such as a non-imaging photodetector can be processed to characterize an additive manufacturing build process.

FIG. 8 shows an alternative process in which data recorded by an optical sensor such as a non-imaging photodetector can be processed to characterize an additive manufacturing build process. At 802, raw sensor data is received that can include both build plane intensity data and energy source drive signals correlated together. At 804, by comparing the drive signal and build plane intensity data, individual scans can be identified and located within the build plane. Generally the energy source drive signal will provide at least start and end positions from which the area across which the scan extends can be determined. At 806, raw sensor data associated with an intensity or power of each scan can be binned into corresponding X & Y grid regions. In some embodiments, the raw intensity or power data can be converted into energy units by correlating the dwell time of each scan in a particular grid region. In some embodiments, each grid region can represent one pixel of an optical sensor monitoring the build plane. It should be noted that different coordinate systems, such as polar coordinates, could be used to store grid coordinates and that storage of coordinates should not be limited to Cartesian coordinates. In some embodiments, different scan types can be binned separately so that analysis can be performed solely on particular scan types. For example, an operator may want to focus on contour scans if those types of scans are most likely to include unwanted variations. At 808, energy input at each grid region can be summed up so that a total amount of energy received at each grid region can be determined using equation (8).

$$E_{pd_m} = \sum_{n=1}^{pixel\ samples\ in\ grid\ cell} E_{pd_n} \quad \text{Eq(8)}$$

This summation can be performed just prior to adding a new layer of powder to the build plane or alternatively, summation may be delayed until a predetermined number of layers of powder have been deposited. For example, summation could be performed only after having deposited and fused portions of five or ten different layers of powder during an additive manufacturing process. In some embodiments, a sintered layer of powder can add about 40 microns to the thickness of a part; however this thickness will vary depending on a type of powder being used and a thickness of the powder layer.

At 810, the standard deviation for the samples detected and associated with each grid region is determined. This can help to identify grid regions where the power readings vary by a smaller or greater amount. Variations in standard deviation can be indicative of problems with sensor performance and/or instances where one or more scans are missing or having power level far outside of normal operating parameters. Standard deviation can be determined using Equation (9).

$$E_{pd_{sm}} = \sqrt{\frac{1}{\#\,\text{sample-in-location} - 1} \sum_{n=1}^{sample-in-pixel} (E_n - \overline{E})^2} \quad \text{Eq (9)}$$

At 812, a total energy density received at each grid region can be determined by dividing the power readings by the overall area of the grid region. In some embodiments, a grid region can have a square geometry with a length of about 250 microns. The energy density for each grid region can be determined using Equation (10).

$$E_{grid\ location} = \frac{\sum_{n=1}^{samples-in-location} E_{pd_n}}{A_{grid\ location}} \quad \text{Eq (10)}$$

At 814, when more than one part is being built, different grid regions can be associated with different parts. In some embodiments, a system can included stored part boundaries that can be used to quickly associate each grid region and its associated energy density with its respective part using the coordinates of the grid region and boundaries associated with each part.

At 816, an area of each layer of a part can be determined. Where a layer includes voids or helps define internal cavities, substantial portions of the layer may not receive any energy. For this reason, the affected area can be calculated by summing only grid regions identified as receiving some amount of energy from the energy source. At 818, the total amount of power received by the grid regions within the portion of the layer associated with the part can be summed up and divided by the affected area to determine energy density for that layer of the part. Area and energy density can be calculated using Equations (11) and (12).

$$A_{part} = \sum_{n=1}^{part\ pixel} 1(E_{pd_n} > 0) \quad \text{Eq (11)}$$

$$IPQM_{part_{layer}} = \frac{\sum_{n=1}^{part\ grid\ locations} E_{pd_n}}{A_{part}} \quad \text{Eq (12)}$$

At 820, the energy density of each layer can be summed together to obtain a metric indicative of the overall amount of energy received by the part. The overall energy density of the part can then be compared with the energy density of other similar parts on the build plane. At 822, the total energy from each part is summed up. This allows high level comparisons to be made between different builds. Build comparisons can be helpful in identifying systematic differences such as variations in powder and changes in overall power output. Finally at 824, the summed energy values can be compared with other layers, parts or build planes to determine a quality of the other layers, parts or build planes.

It should be appreciated that the specific steps illustrated in FIG. 8 provide a particular method of characterizing an additive manufacturing build process according to another embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9A:
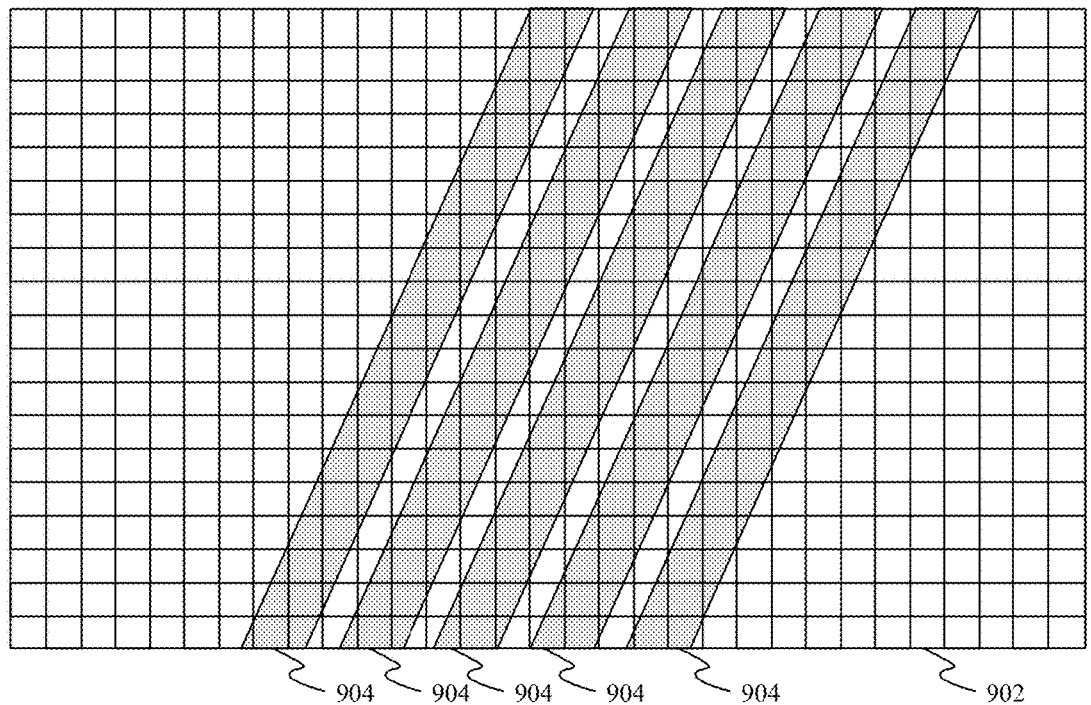
FIGS. 9A-9D show visual depictions indicating how multiple scans can contribute to the power introduced at individual grid regions.
Figure 9B:
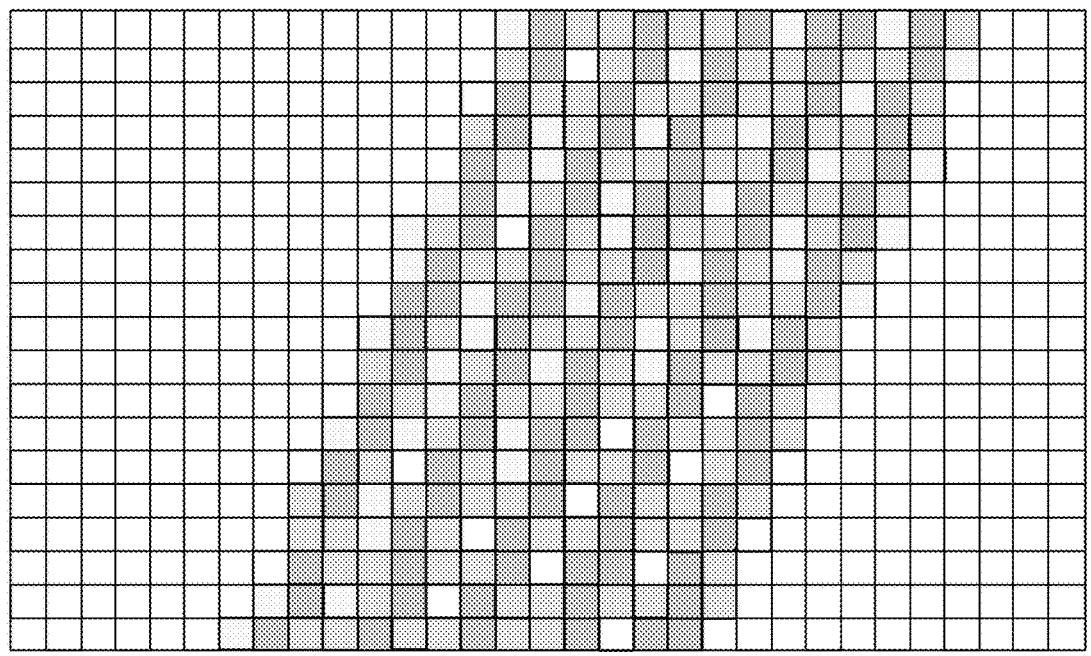

FIGS. 9A-9D show visual depictions indicating how multiple scans can contribute to the power introduced at individual grid regions. FIG. 9A depicts a grid pattern made up of multiple grid regions 902 distributed across a portion of a part being built by an additive manufacturing system. FIG. 9A also depicts a first pattern of energy scans 904 extending diagonally across a grid regions 902. The first pattern of energy scans 902 can be applied by a laser or other intense source of thermal energy scanning across grid 904. FIG. 9B shows how the energy introduced across the part is represented in each of grid regions 902 by a singular gray scale color representative of an amount of energy received where darker shades of gray correspond to greater amounts of energy. It should be noted that in some embodiments the size of grid regions 902 can be reduced to obtain higher resolution data. Alternatively, the size of grid regions 902 could be increased to reduce memory and processing power usage.

Figure 9C:
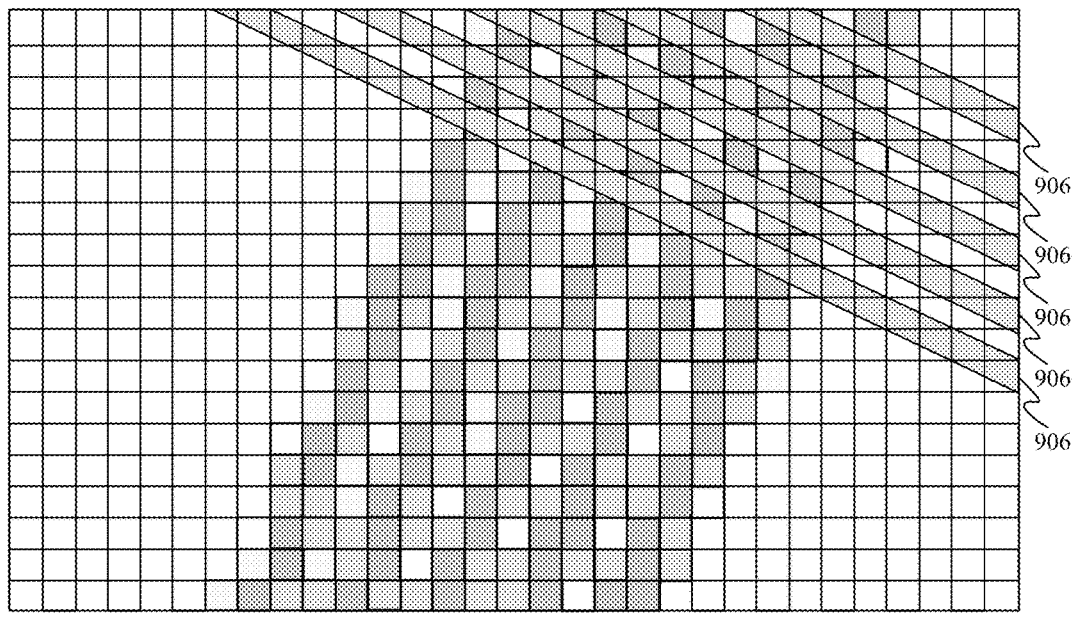
Figure 9D:
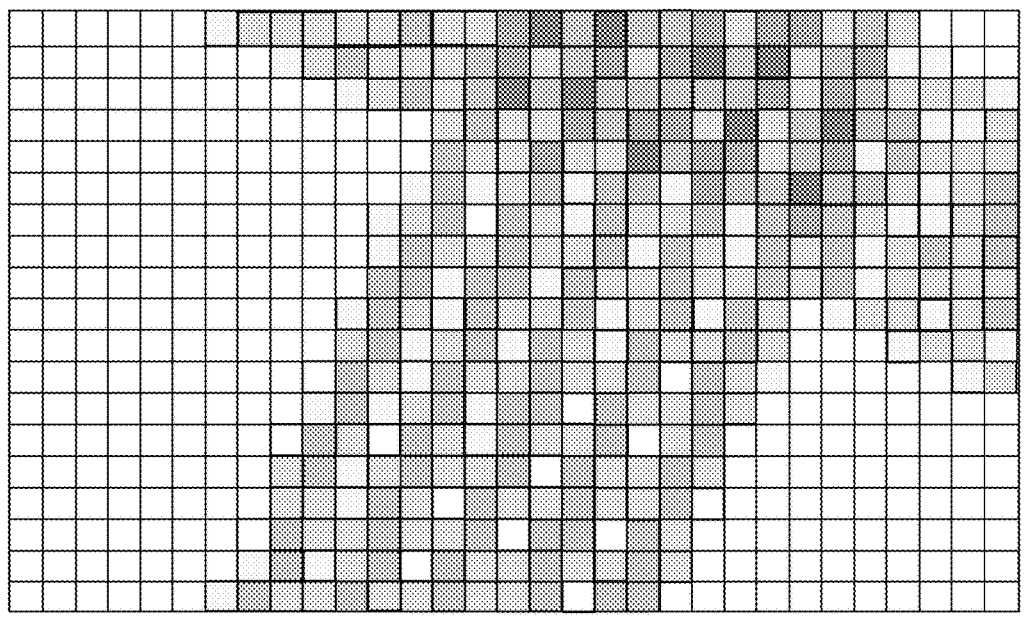

FIG. 9C shows a second pattern of energy scans 906 overlapping with at least a portion of the energy scans of the first pattern of energy scans. As discussed in the text accompanying FIG. 8, where the first and second patterns of energy scans overlap, grid regions are shown in a darker shade to illustrate how energy from both scans has increased the amount of energy received over the overlapping scan patterns. Clearly, the method is not limited to two overlapping scans and could include many other additional scans that would get added together to fully represent energy received at each grid region.

Figure 10A:
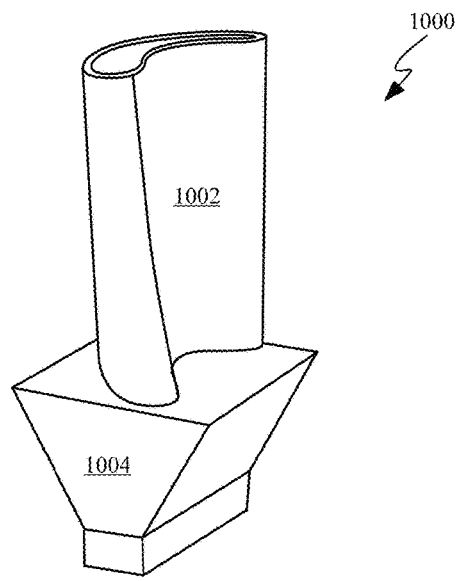
FIG. 10A shows an exemplary turbine blade suitable for use with the described embodiments.
Figure 10B:
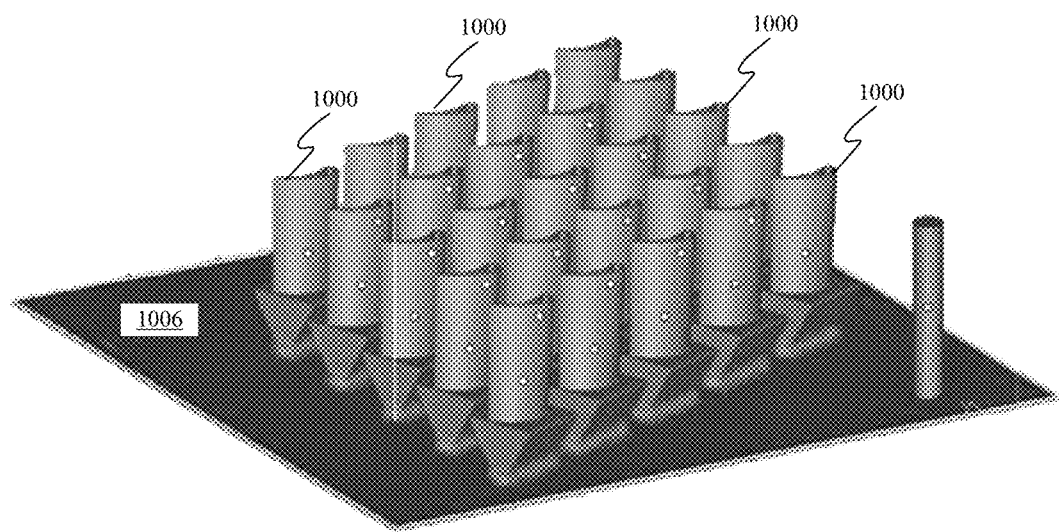
FIG. 10B shows an exemplary manufacturing configuration in which 25 turbine blades can be concurrently manufactured atop a build plane 1006.

FIG. 10A shows an exemplary turbine blade 1000 suitable for use with the described embodiments. Turbine blade 1000 includes multiple different surfaces and includes a number of different features that require many different types of complex scans to produce. In particular, turbine blade 1000 includes a hollow blade portion 1002 and a tapered base portion 1004. FIG. 10B shows an exemplary manufacturing configuration in which 25 turbine blades 1000 can be concurrently manufactured atop build plane 1006.

Figure 10C:
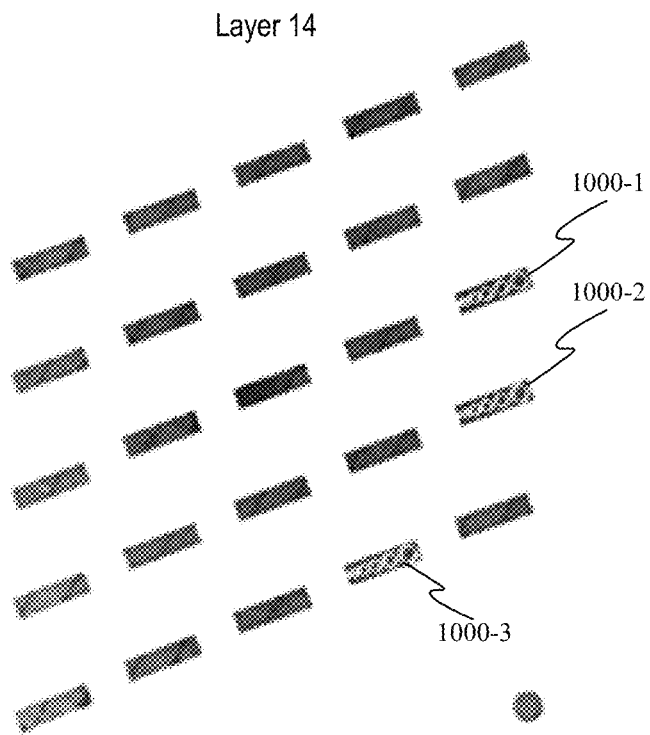
FIGS. 10C-10D show different cross-sectional views of different layers of the configuration depicted in FIG. 10B.
Figure 10D:
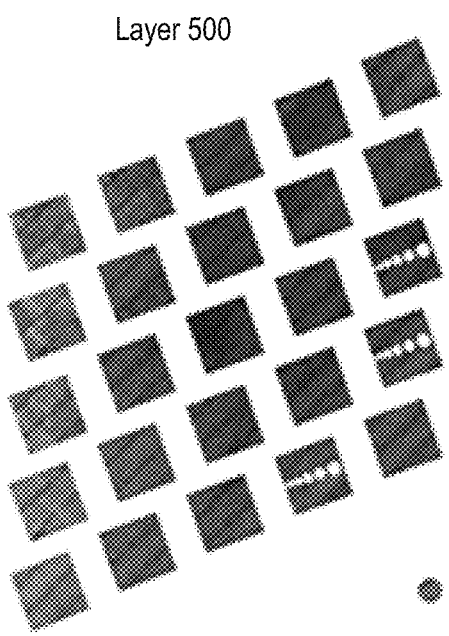

FIGS. 10C-10D show different cross-sectional views of different layers of the configuration depicted in FIG. 10B with grid TED based visualization layers. FIG. 10C shows layer 14 of turbine blades 1000 and the TED based visualization layer illustrates how a lower end of select ones of base portion 1004 can define multiple voids in turbine blades 1000-1, 1000-2 and 1000-3. Because energy density data is associated with discrete grid regions, these voids, which would otherwise be completely concealed within the turbine blades are clearly visible in this grid TED based visualization. FIG. 10D shows how an upper end of base portion 1004 can also define multiple concealed voids within turbine blades 1000-1, 1000-2 and 1000-3, which are clearly discernable from the grid TED based visualization layer depicted in FIG. 10D.

Figure 11A:
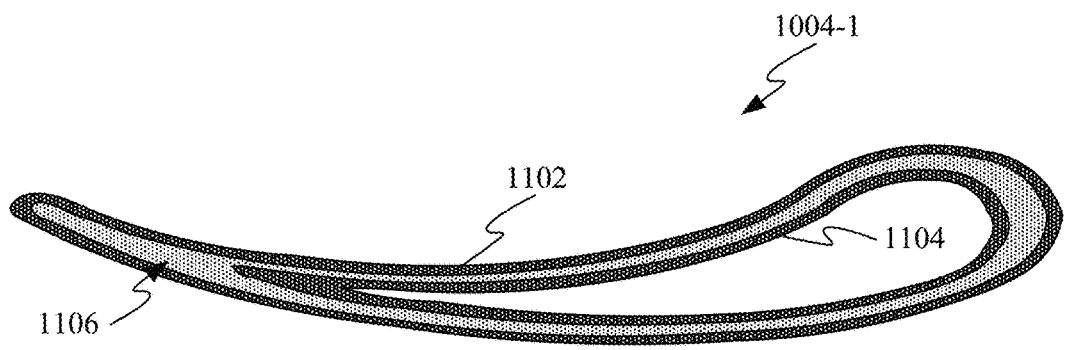
FIGS. 11A-11B show cross-sectional views of base portions of two different turbine blades.
Figure 11B:
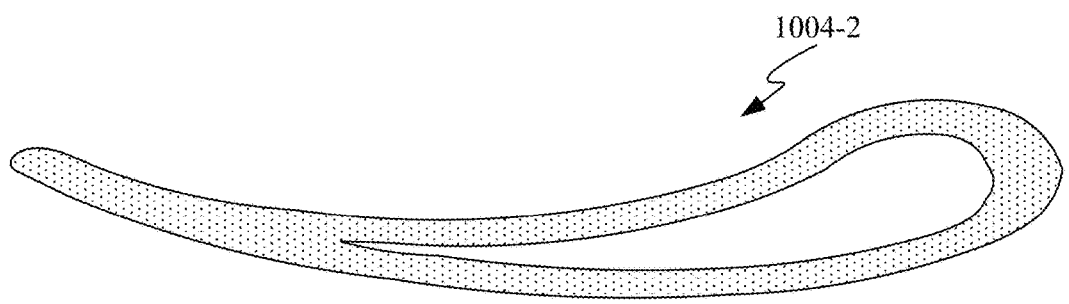

FIGS. 11A-11B show cross-sectional views of base portions 1004-1 and 1004-2 of two different turbine blades 1000. FIG. 11A shows base portion 1004-1, which was produced using nominal manufacturing settings. Outer surfaces 1102 and 1104 of base portions 1004-1 receive substantially more energy than interior 1106 of base portion 1004-1. The increased energy input into the outer surfaces provides a more uniform hardened surface, resulting in an annealing effect being achieved along outer surfaces 1102 and 1104. This additional energy can be introduced using higher energy contour scans that target outer surfaces 1102 and 1104. FIG. 11B shows base portion 1004-2, which was produced with the same manufacturing settings as 1004-2 with the exception of omitting the contour scans. While all the scans utilized in the manufacturing operation producing base portion 1004-2 were also included in producing base portion 1004-1, summing energy density inputs for all the scans covering each grid region allows an operator to clearly see a difference between base portions 1004-1 and 1004-2.

Figure 11C:
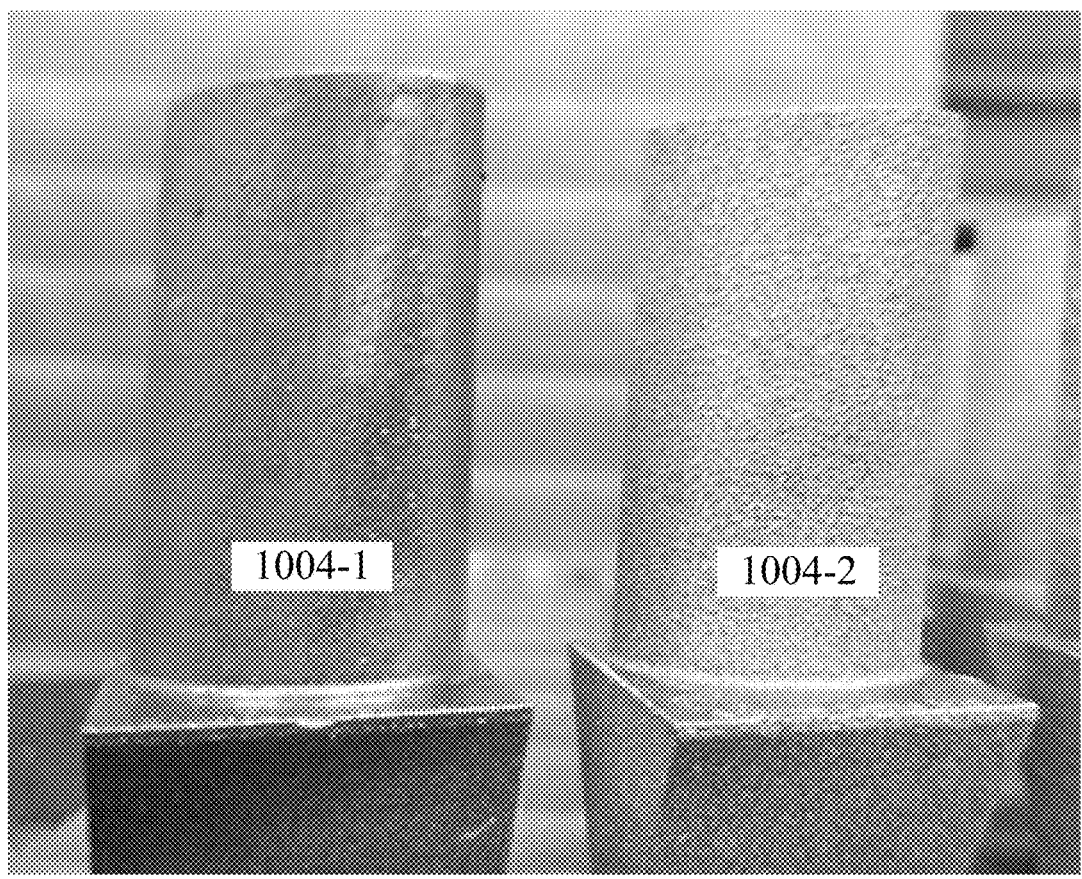
FIG. 11C shows a picture illustrating the difference in surface consistency between two different base portions.

FIG. 11C shows the difference in surface consistency between base portions 1004-1 and 1004-2. Clearly, omitting the contour scans for base portion 1004-2 has a substantial effect on overall outer surface quality. Outer surfaces for base portion 1004-1 are smoother and less porous in consistency. The annealing effect on base portion 1004-1 should also give it substantially more strength than base portion 1004-2.

Figure 12:
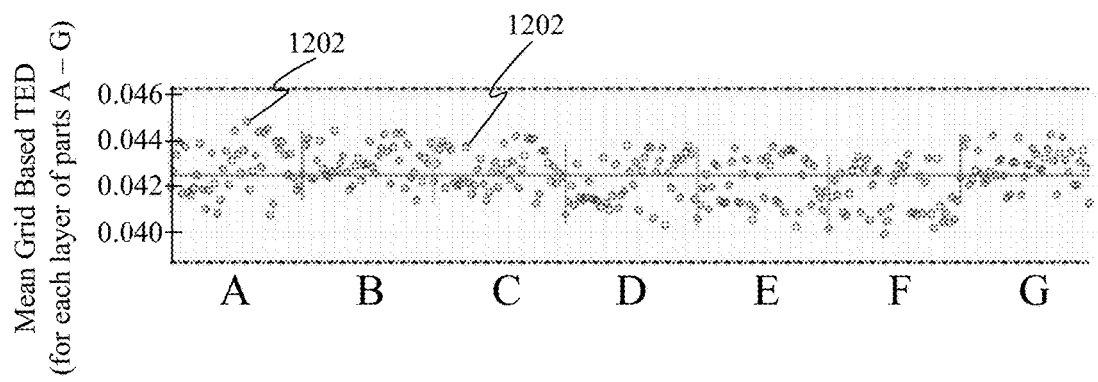
FIG. 12 illustrates thermal energy density for parts associated with multiple different builds.

FIG. 12 illustrates thermal energy density for parts associated with multiple different builds. Builds A-G each include thermal emission data for about 50 different parts (represented by discrete circles 1202) built during the same additive manufacturing operation. This illustration shows how thermal emission data can be used to track variations between different builds. For example, lots A, B and C all have similar TED distributions; however, builds D, E and F while still being within tolerances have consistently lower thermal emission data. In some cases, these types of changes can be due to changes in powder lots. In this way, the thermal emission data can be used to track systematic errors that may negatively affect overall output quality. It should be noted that while this chart depicts mean TED values based on grid TED that a similar chart could be constructed for a scan-based TED methodology.

Figure 13:
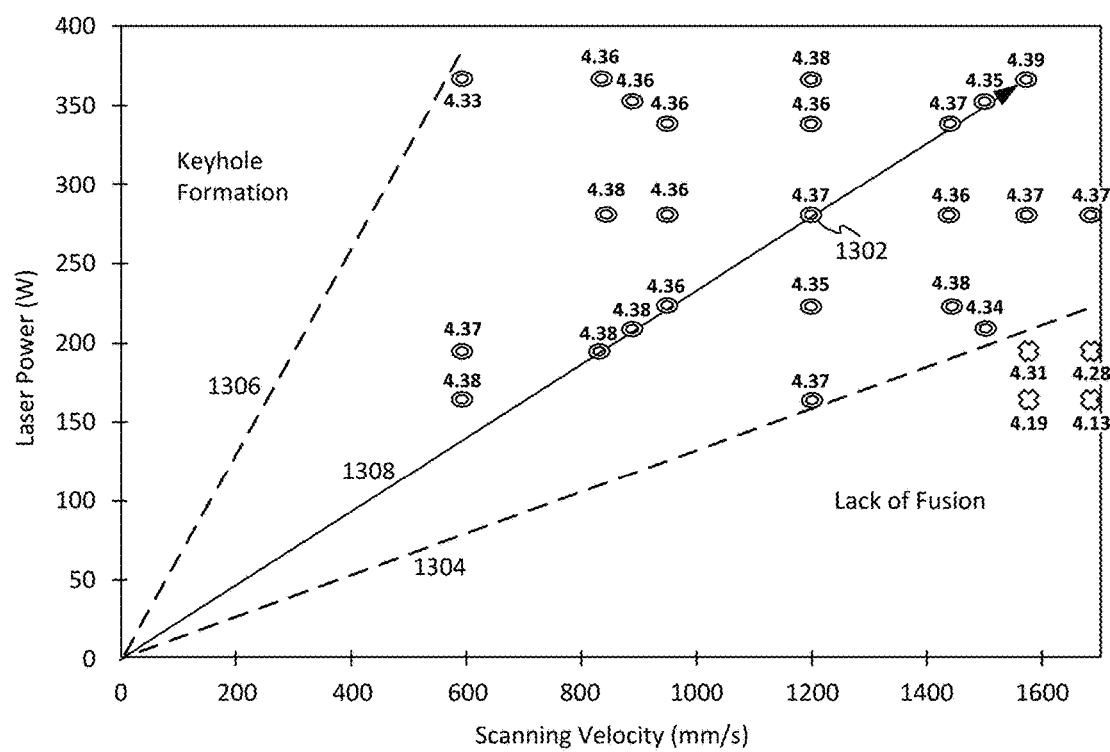
FIGS. 13-14B illustrate an example of how thermal energy density can be used to control operation of a part using in-situ measurements.
Figure 14A:
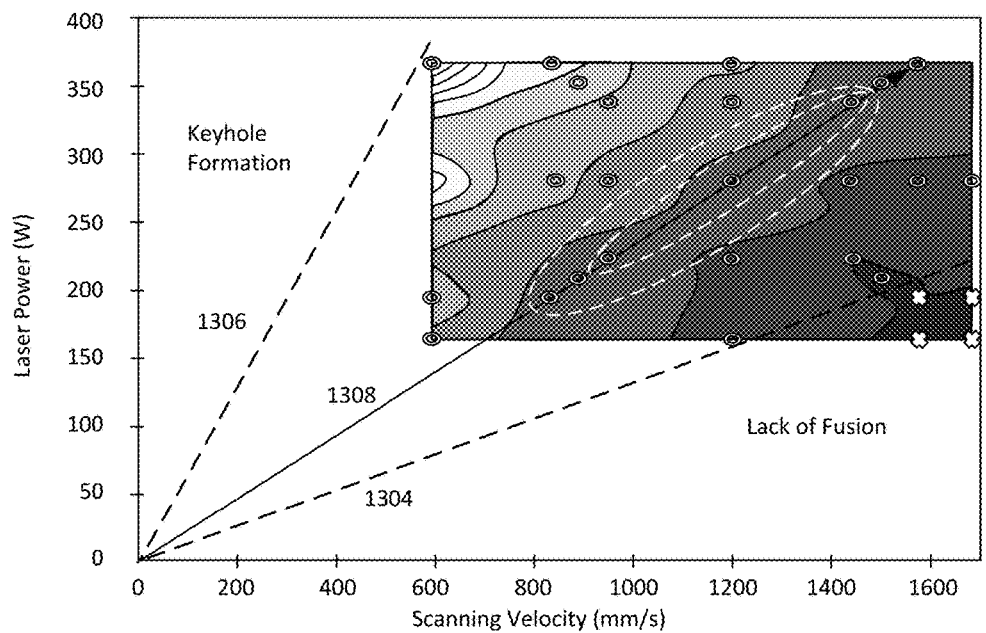
FIG. 14C shows another power-density graph emphasizing various physical effects resulting from energy source settings falling too far out of a process window.
FIG. 14D shows how a size and shape of a melt pool can vary in accordance with laser power and scanning velocity settings.
Figure 14B:
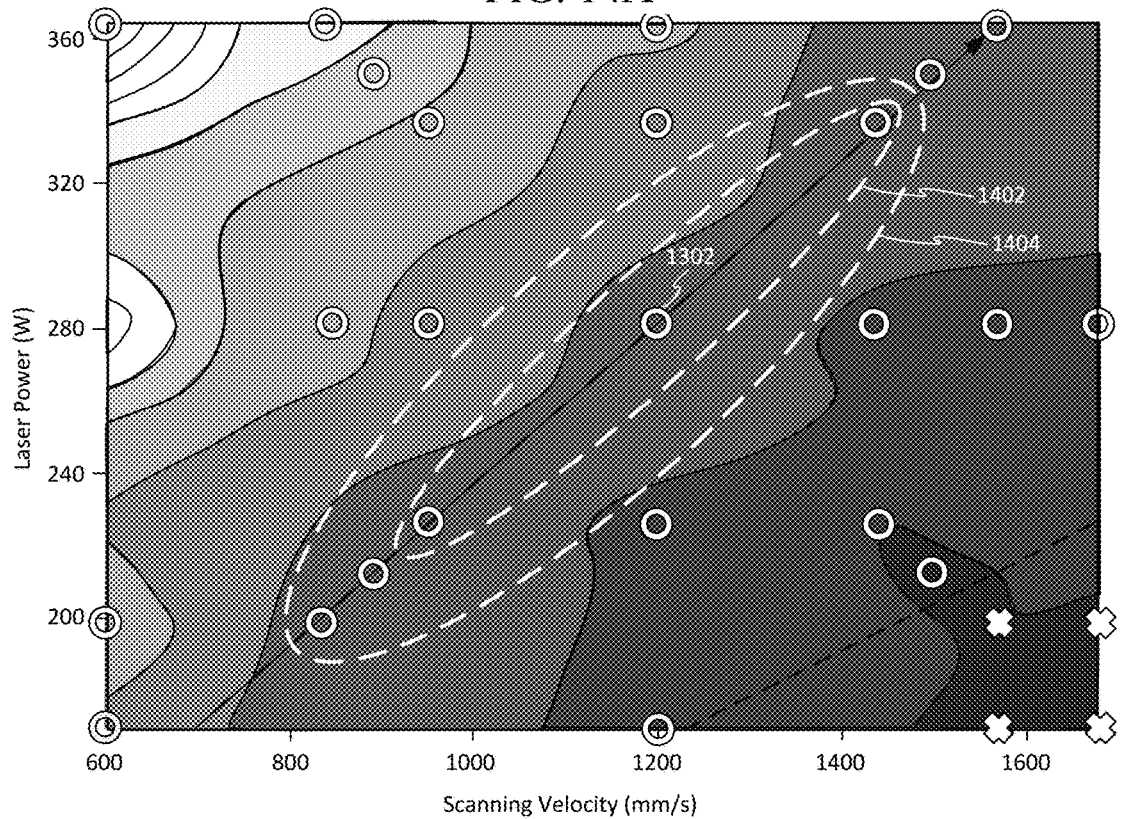

FIGS. 13-14B illustrate an example of how thermal energy density can be used to control operation of a part using in-situ measurements. FIG. 13 shows how parts being produced using different combinations of energy source power and scan speed can be produced and then destructively analyzed to determine a resulting part density in grams/cubic centimeter, as depicted. In this trial, a part associated with part density 1302, which has a part density of 4.37 g/cc, was produced using manufacturer recommended scan and laser power settings. Based on the resulting density readings, a position of dashed line 1304 can be determined. Line 1304 indicates where a resulting lowered amount of energy input results in portions of the powder not being sufficiently heated to fuse together resulting in part densities that fall below a threshold density level. Part density can also be reduced when too much energy is added to the system resulting in the formation of keyholes within the parts resulting from powder being vaporized instead of melted during a manufacturing operation. Dashed line 1306 can be experimentally determined from the density data and in this example is identified by part density falling as low as 4.33 g/cc. Line 1308 represents an optimum energy density contour along which energy density and part geometry stay substantially constant. The density testing shows how the average density of parts created using settings distributed along line 1308 stays relatively consistent.

FIGS. 14A-14B show a thermal energy density contour overlaid upon a portion of the power-density graph and illustrate how thermal density measurements collected during an additive manufacturing operation vary depending on the settings used by the energy source. As depicted in FIGS. 14A-14B darker shading indicates higher thermal energy densities and lighter shading indicates lower thermal energy densities. From the part density testing and thermal energy density contours, control limits can be determined for a particular part. In this case, the control limits, indicated by ellipse 1402, have been determined and allow power and scan speed parameters to vary from the settings used to produce part 1302 by up to 3σ along line 1308 and 1σ along a line perpendicular to line 1308. In some embodiments, the allowable variation in power and speed allows for in-process adjustments to be made in order to maintain a desired thermal energy density during production runs. Ellipse 1404 indicates an overall process window that can accommodate further variations outside the control limits. In some embodiments, this process window can be used to identify variations that would still allow a resulting part to be validated using only in-process data. It should be noted that while the depicted control and process windows are shown as elliptical, other process window shapes and sizes are possible and may be more complex depending on, for example, part geometries and material eccentricities. During a manufacturing operation, optical sensor readings measuring thermal radiation can be used to determine thermal energy density in situ. In instances where thermal energy density falls outside an expected range when keeping the laser power and scan velocities within the depicted control limits indicated by ellipse 1402, portions of the part with the abnormal thermal energy density readings can be flagged as potential having defects.

In some embodiments, the process windows can be incorporated into a modeling and simulation program that models one or more optical sensors that collect sensor readings used to determine thermal energy density. Once the modeling and simulation system iterates to a first approximation of an instruction set for a workpiece, expected thermal energy density can be output to an additive manufacturing machine for further testing. The modeled thermal energy density data can used by the additive manufacturing machine for further testing and validation, when the additive manufacturing machine includes an optical sensor and computing equipment configured to measure thermal energy density. A comparison of the modeled and measured thermal energy density can be used to confirm how closely performance of the instructions set matches the expected outcome in situ.

Figure 14C:
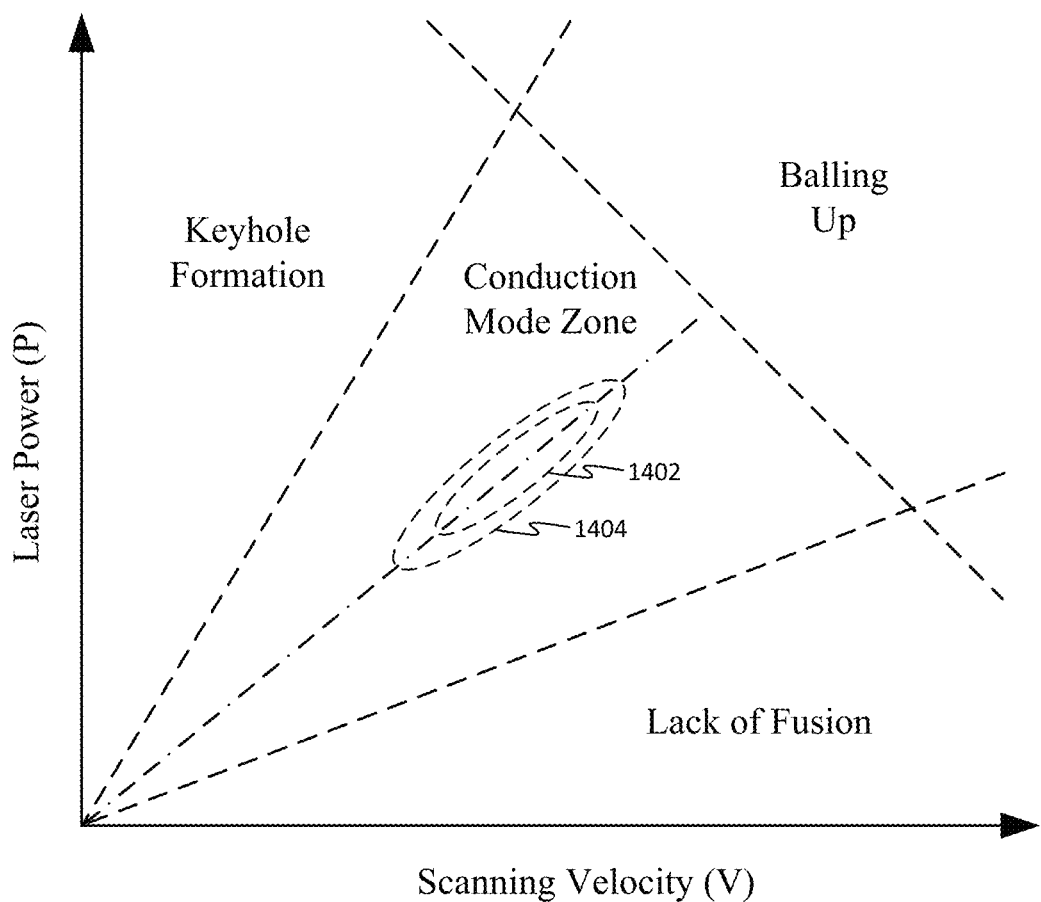

FIG. 14C shows another power-density graph emphasizing various physical effects resulting from energy source settings falling too far out of process window 1404. For example, the power density graph shows that adding large amounts of laser power at low scanning velocities results in keyholes being formed within the workpiece. Keyhole formation occurs due to portions of the powder material evaporating due to receiving too much energy. Furthermore, low power combined with high scanning velocities can result in a failure of the powder to fuse together. Finally, high power levels combined with high scanning velocities result in fused metal balling up during a build operation. It should be noted that varying a thickness of the deposited power layer can result in a shift of the lines separating the conduction mode zone from keyhole formation zones and lack of fusion zones. For example, increasing the thickness of the powder layers has the effect of increasing the slope of the lines separating the keyhole and lack of fusion regions from the conduction mode zone as a thicker layer generally requires more energy to undergo liquefaction.

FIG. 14C also shows how power and scan velocity settings corresponding to the conduction mode zone don't generally result in any of the aforementioned serious defects; however, by keeping the laser settings corresponding to values within process window 1404 a resulting grain structure and/or density of the part can be optimized. Another benefit of keeping the energy source settings within process window 1404 is that these settings should keep thermal energy density readings within a narrow range of values. Any thermal energy density values falling outside of the predetermined range during a manufacturing operation can be indicative of a problem in the manufacturing process. These problems can be addressed by moving the settings closer to a central region of the process window and/or by updating the process window for subsequent parts. In some embodiments, a manufacturer could discover that the fault was caused by defective powder or some other infrequent aberration that should not be factored into subsequent manufacturing processes. It should be appreciated that the depicted process window may not be the same for all portions of a part and could vary greatly depending on what region or even specific layer of the part was being worked on at a particular time. The size and/or shape of process window 1404 can also vary in accordance with other factors such as hatch spacing, scan length and scan direction in some embodiments.

Figure 14D:
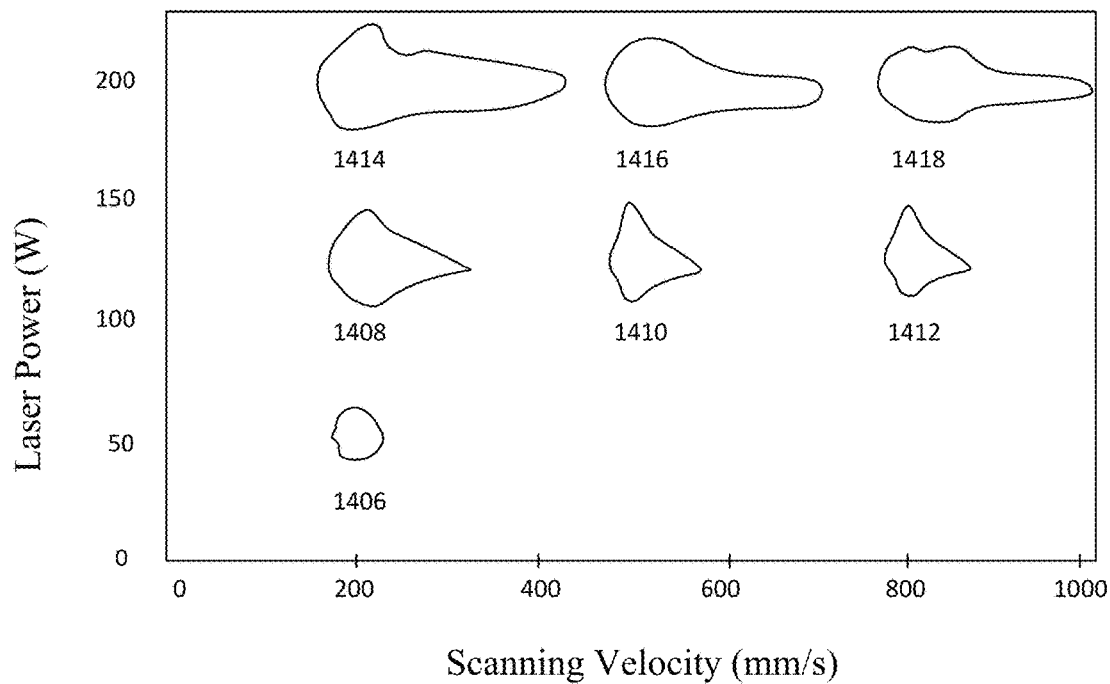

FIG. 14D shows how a size and shape of a melt pool can vary in accordance with laser power and scanning velocity settings. Exemplary melt pools 1406-1418 exhibit exemplary melt pool size and shape for various laser power and velocity settings. In general, it can be seen that larger melt pools result from higher amounts of laser power and lower scan velocities. However, for this particular configuration melt pool size depends more upon laser power than velocity.

Figure 15A:
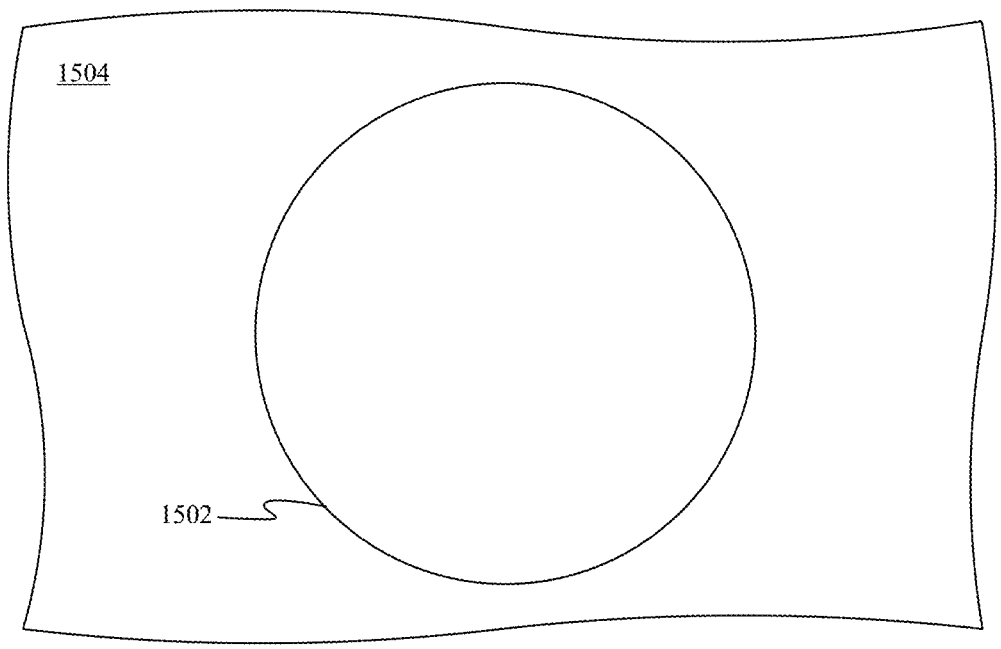
FIGS. 15A-15F illustrate how a grid can be dynamically created to characterize and control an additive manufacturing operation.
Figure 15B:
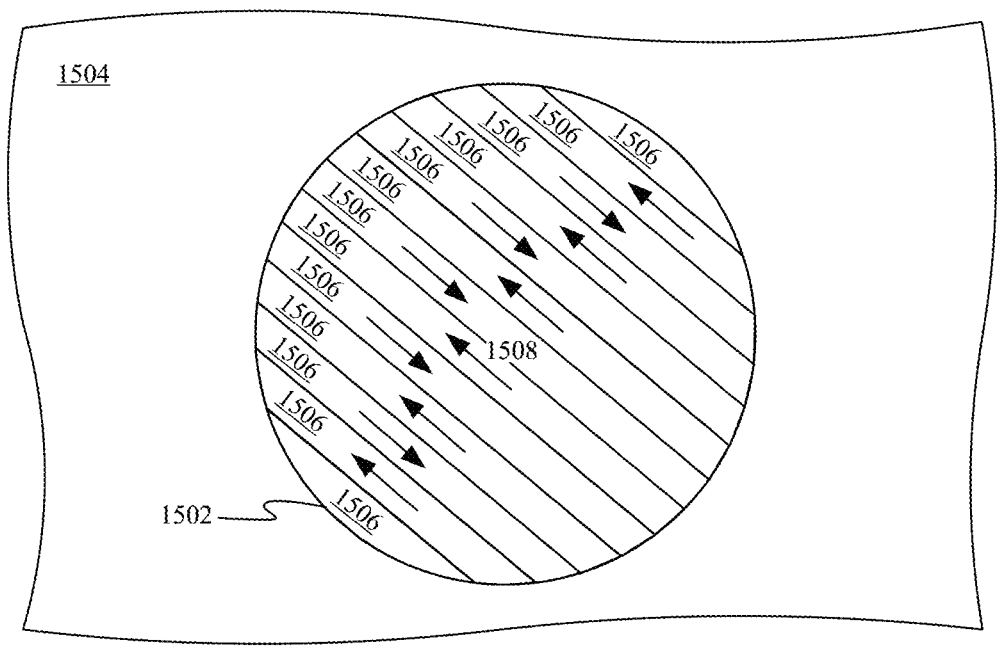

FIGS. 15A-15F illustrate how a grid can be dynamically created to characterize and control an additive manufacturing operation. FIG. 15A shows a top view of a cylindrical workpiece 1502 positioned upon a portion of a build plane 1504. Workpiece 1502 is shown as it undergoes an additive manufacturing operation. FIG. 15B shows how cylindrical workpiece 1502 can be divided into multiple tracks 1506 along which an energy source can melt powder distributed on an upper surface of cylindrical workpiece 1502. In some embodiments, the energy source can alternate directions 1506 as depicted while in other embodiments the energy source can always move in one direction. Furthermore a direction of tracks 1506 can vary from layer to layer in order to further randomize the orientation of scans used to build workpiece 1502.

Figure 15C:
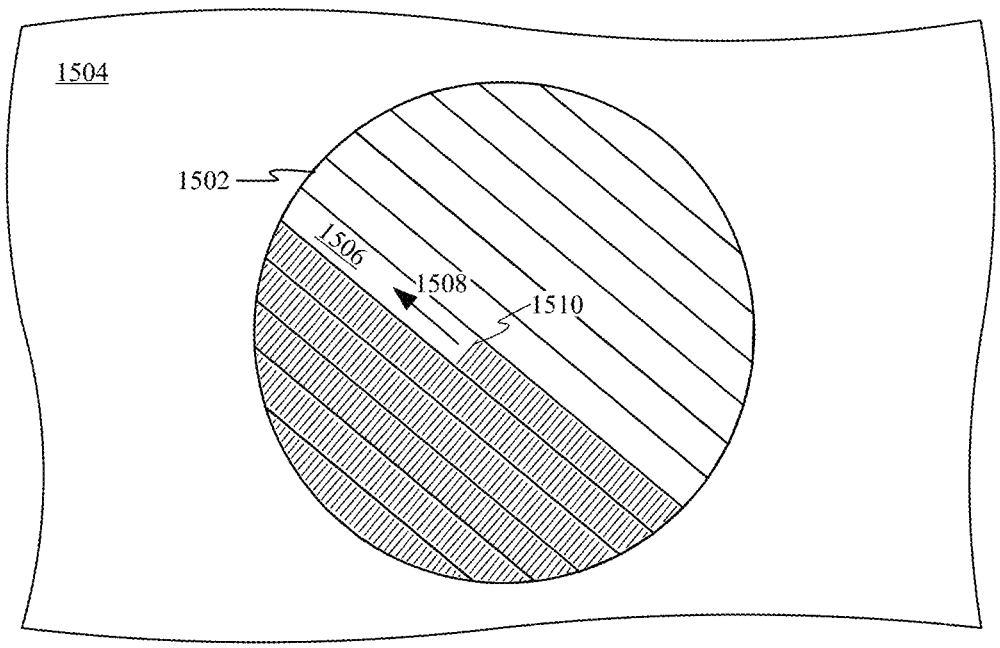

FIG. 15C shows an exemplary scan pattern for the energy source as it forms a portion of workpiece 1502. As indicated, by arrow 1508 a direction of movement of across workpiece 1502 of an exemplary energy source is diagonal. Individual scans 1510 of the energy source can be oriented in a direction perpendicular to the direction of movement of the energy source along track 1506 and extend entirely across track 1506. The energy source can turn off briefly between successive individual scans 1510. In some embodiments, a duty cycle of the energy source can be about 90% as it traverses each of tracks 1506. By employing this type of scan strategy, the energy source can cover a width of track 1506 as it traverses across workpiece 1502. In some embodiments, swath 1510 can have a width of about 5 mm. This can substantially reduce the number of tracks needed to form workpiece 1502 as in some embodiments a width of a melt pool generated by the energy source can be on the order of about 80 microns.

Figure 15D:
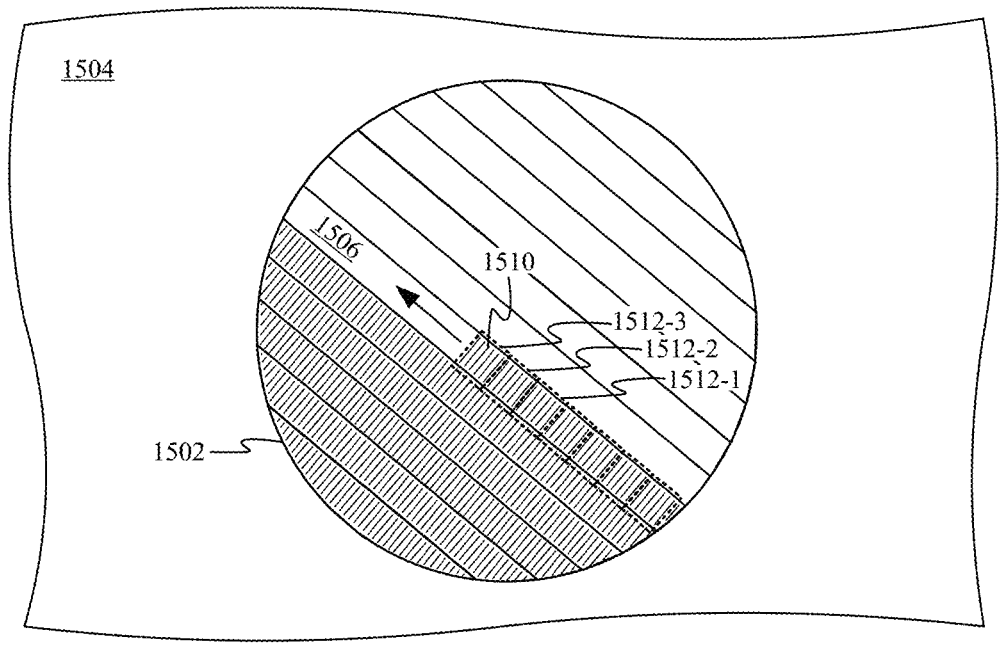
Figure 15E:
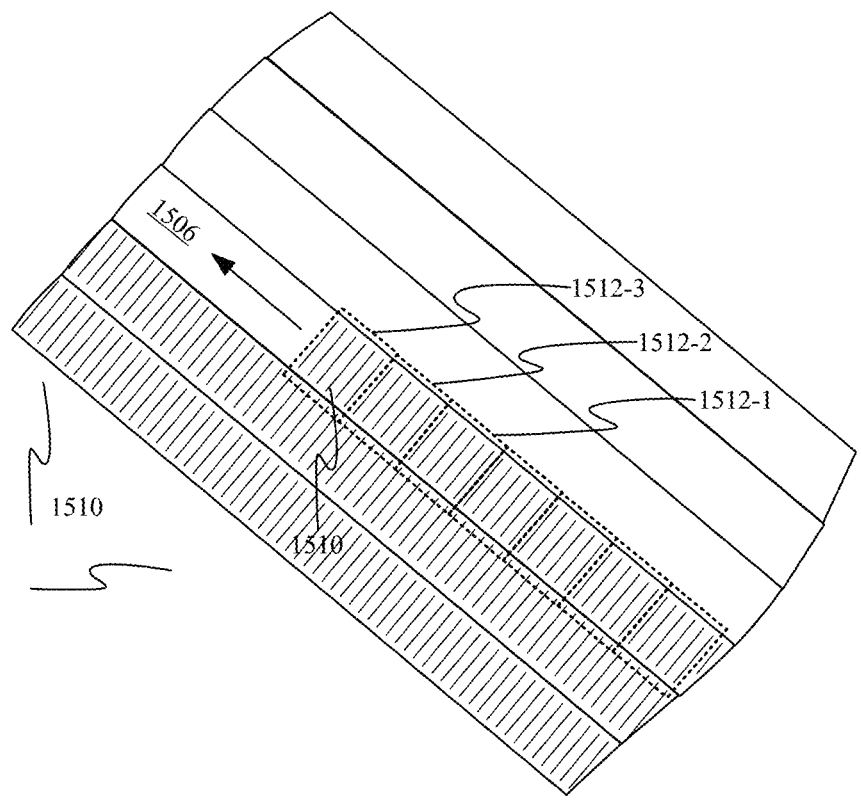

FIGS. 15D-15E show how grid regions 1512 can be dynamically generated along each track 1506 and be sized to accommodate a width of each individual scan 1510. A precise position of subsequent scans can be forecast by the system by referencing energy source drive signals enroute to the energy source. In some embodiments the width of grids 1512 can match the length of individual scans 1512 or be within 10 or 20% of the length of individual scans 1512. Again, scan length of individual scans 1512 can be anticipated by referencing the energy source drive signals. In some embodiments, grid regions 1512 can be square or rectangular in shape. A thermal energy density can be determined for each of grid regions 1512 as the energy source continues along track 1506. In some embodiments, thermal energy density readings within grid region 1512-1 could be used to adjust an output of the energy source within the next grid region, grid region 1512-2 in this case. For example, if the thermal energy density readings generated by individual scans 1510 within grid region 1512-1 are substantially higher than expected, energy source power output can be reduced, a speed at which energy source scans across individual scans 1510 can be increased and/or spacing between individual scans 1510 can be increased within grid region 1512-2. These adjustments can be made as part of a closed loop control system. While only five individual scans 1510 are shown within each region this is done for exemplary purposes only and the actual number of individual scans within a grid region 1512 can be substantially higher. For example, where the melt zone generated by the energy source is about 80 microns wide it could take about 60 individual scans 1510 in order for all the powder within a 5 mm square grid region 1512 to fall within the melt zone.

Figure 15F:
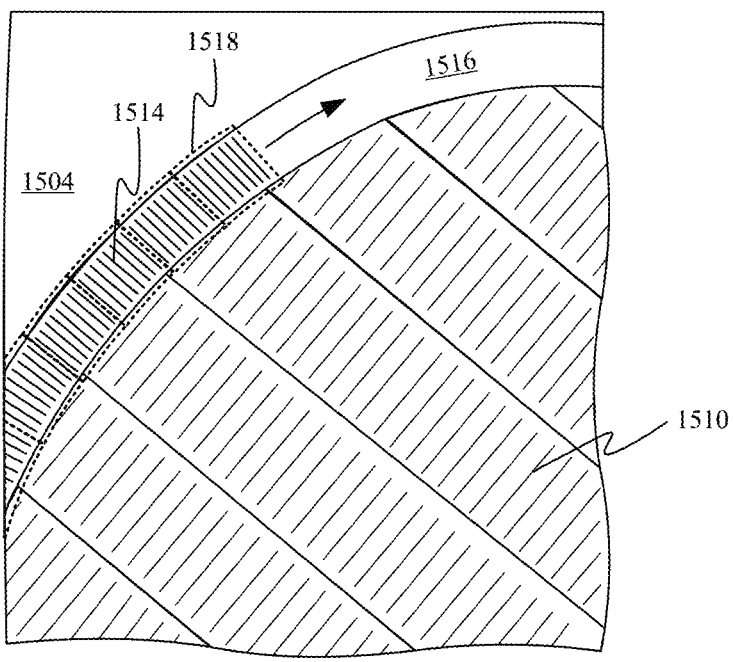

FIG. 15F shows an edge region of workpiece 1502 once the energy source finishes traversing the pattern of tracks 1506. In some embodiments, the energy source can continue to add energy to workpiece 1502 subsequent to a majority of the powder having been melted and resolidified. For example, contour scans 1514 can track along an outer periphery 1516 of workpiece 1502 in order to apply a surface finish to workpiece 1502. It should be appreciated that contour scans 1514 as depicted are substantially shorter than individual scans 1510. For this reason, grid regions 1518 can be substantially narrower than grid regions 1512. It should also be noted that grid regions 1518 are not purely rectangular in shape as in this case they follow the contour of the outer periphery of workpiece 1502. Another instances that may result in scan length differences could be where a workpiece includes walls of varying thickness. A variable thickness wall could result in scans length varying within a single grid region. In such a case, an area of each grid region could be kept consistent by increasing the length of the grid region while narrowing the width to conform to changes in the length of individual scans.

Figure 16:
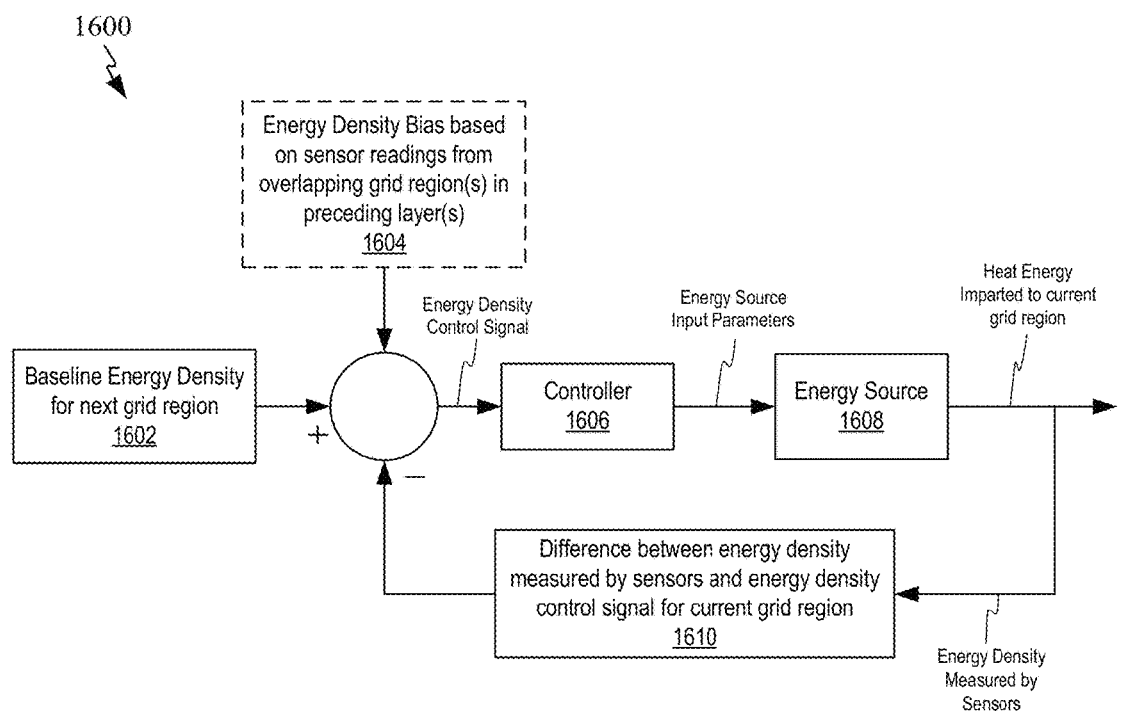
FIG. 16 shows an exemplary control loop 1600 for establishing and maintaining feedback control of an additive manufacturing operation.

FIG. 16 shows a closed loop control example showing feedback control loop 1600 for establishing and maintaining feedback control of an additive manufacturing operation. At block 1602 a baseline thermal energy density for the next grid region across which the energy source is about to traverse is input into the control loop. This baseline thermal energy density reading can be established from modeling and simulation programs and/or from previously run experimental/test runs. In some embodiments, this baseline thermal energy density data can be adjusted by energy density bias block 1604 which includes energy density readings for various grid regions recorded during preceding layers. Energy density bias block 1604 can include an adjustment to baseline energy density block in instances where preceding layers received too much or too little energy. For example, where optical sensor readings indicate a thermal energy density below nominal in one region of a workpiece, energy density bias values can increase the value of the baseline energy density for grid regions overlapping the grid regions with below nominal thermal energy density readings. In this way, the energy source is able to fuse additional powder that was not fully fused during the preceding layer or layers.

FIG. 16 also shows how the inputs from block 1602 and 1604 cooperatively create an energy density control signal that is received by controller 1606. Controller 1606 is configured to receive the energy density control signal and generate heat source input parameters configured to generate the desired thermal energy density within the current grid region. Input parameters can include power, scan velocity, hatch spacing, scan direction and scan duration. The input parameters are then received by energy source 1608 and any changes in the input parameters are adopted by energy source 1608 for the current grid region. Once optical sensors measure the scans of energy source 1608 making up the current grid region, at block 1610 thermal energy density for the current grid region is calculated and compared to the energy density control signal. If the two values are the same then no change to energy density control signal is made based upon the optical sensor data. However, if the two values are different the difference is added or subtracted from the energy density control signal for scans made in the next grid region.

In some embodiments, grid regions for the current layer and all preceding layers can be dynamically generated grid regions that are oriented in accordance with a path and scan length/width of scans performed by the energy source. In this type of configuration both baseline energy density and energy density bias can both be based on dynamically generated grid regions. In other embodiments, grid regions for the current layer can be dynamically generated while energy density bias data 1604 can be based upon energy density readings associated with static grid regions defined prior to the beginning of the additive manufacturing operation, resulting in the static grid regions remaining fixed throughout the part and not varying in position, size or shape. The grids could be uniformly shaped and spaced when a Cartesian grid system is desired but could also take the form of grid regions making up a polar grid system. In other embodiments, the grid regions for the current layer can be statically generated prior to the build operation being carried out and energy density bias data can also be statically generated and share the same grid being used for the current layer.

In some embodiments, thermal emission density can be used in lieu of thermal energy density with control loop 1600. Thermal emission density can refer to other factors in addition to thermal energy density. For example, thermal emission density can be a weighted average of multiple features that include thermal energy density along with one or more other features such as peak temperature, minimum temperature, heating rate, cooling rate, average temperature, standard deviation from average temperature, and a rate of change of the average temperature over time. In other embodiments, one or more of the other features could be used to validate that the scans making up each of the grid regions are reaching a desired temperature, heating rate or cooling rate. In such an embodiment the validation features could be used as a flag to indicate that input parameters for the energy source may need to be adjusted within a defined control window to achieve the desired temperature, heating rate or cooling rate. For example, if peak temperature within the grid region is too low power could be increased and/or scanning velocity decreased. Although discussion of aforementioned control loop 1600 related to various types of grid TED it should be noted that a person with ordinary skill in the art would also understand that scan TED metrics could also be used in a similar loop configuration.

TED Analysis for Recoater Arm Short Feed

Figure 17A:
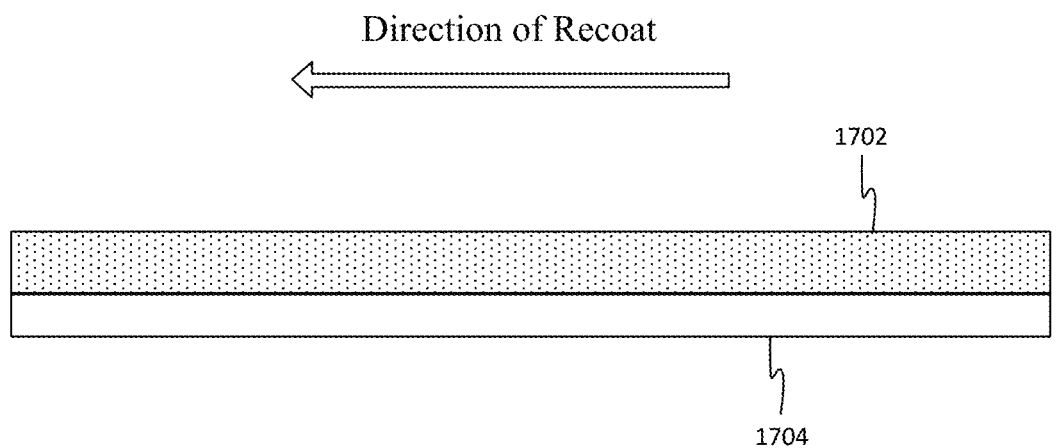
FIG. 17A shows a normal distribution of powder across a build plate.
Figure 17B:
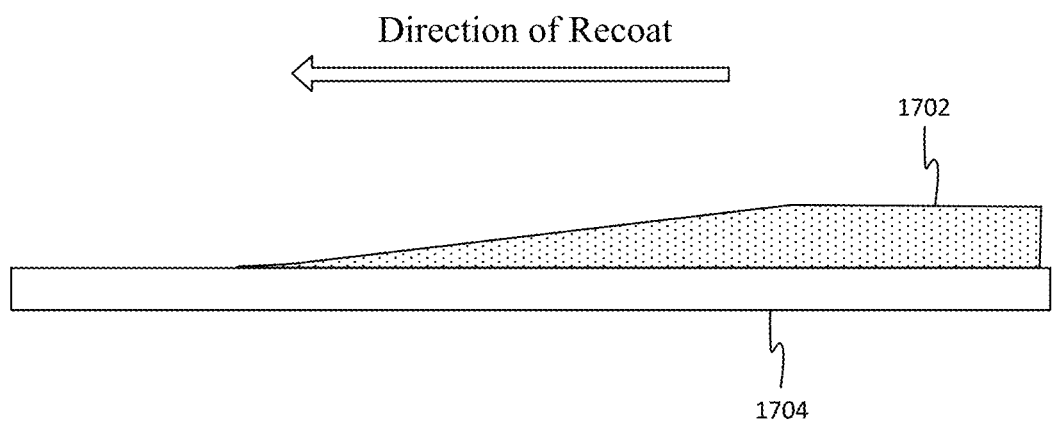
FIG. 17B shows how when an insufficient amount of powder is retrieved and spread across the build plate by a recoater arm, a thickness of a resulting layer of powder can vary.

FIG. 17A shows a normal distribution of powder 1702 across a build plate 1704. This depiction shows how the powder gets spread evenly without any variations in height. In contrast, FIG. 17B shows how when an insufficient amount of powder 1702 is retrieved by a recoater arm, a thickness of powder layer 1702 can vary greatly. Once the recoater arm begins to run out of powder 1702 a thickness of the layer of powder 1702 gradually tapers off until portions of build plate 1704 are left entirely bare of powder 1702. As errors of this sort can have quite negative effects upon the overall quality of the part early detection of this type of phenomenon is important for accurate defect detection.

Figure 17C:
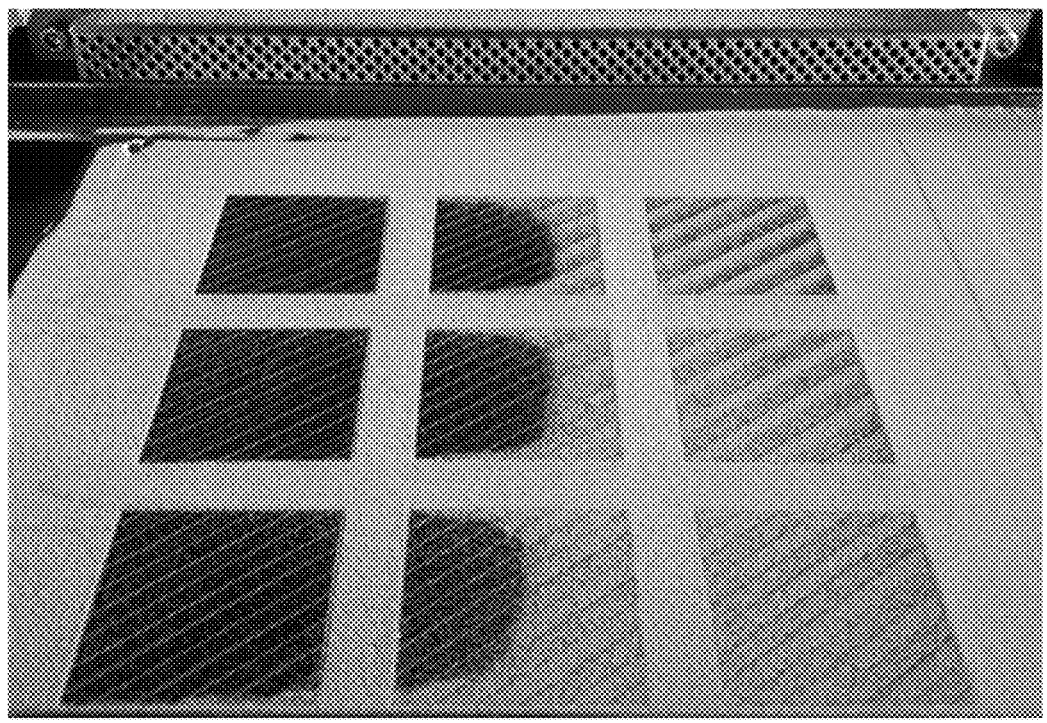
FIG. 17C shows a black and white photo of a build plate in which a short feed of powder resulted in only partial coverage of nine workpieces arranged on a build plate.

FIG. 17C shows a black and white photo of a build plate in which a short feed of powder 1702 resulted in only partial coverage or nine workpieces arranged on a build plane. In particular, three of the workpieces on the right side of the photo are completely covered while three of the workpieces on the left side are almost completely uncovered.

Figure 17D:
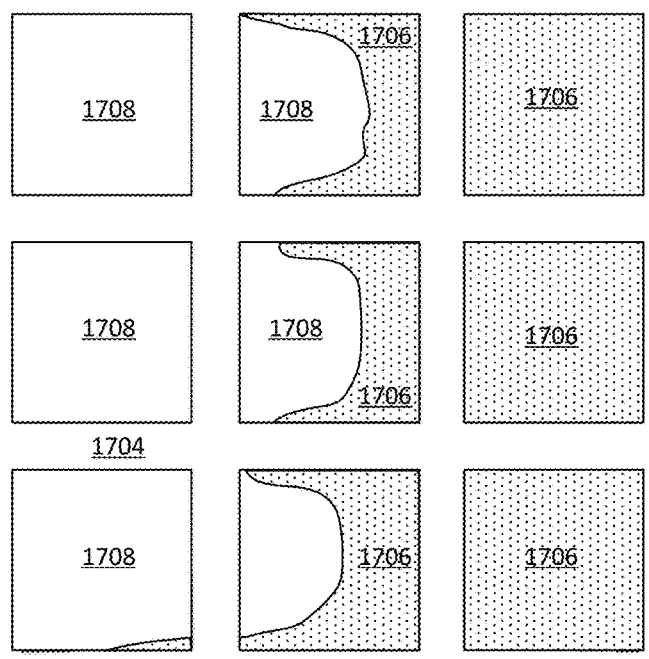
FIG. 17D shows how when an energy source scans across all nine workpieces using the same input parameters, detected thermal energy density is substantially different.

FIG. 17D shows how when an energy source scans across all nine workpieces using the same input parameters, detected thermal energy density is substantially different. Regions 1706 produce substantially higher thermal energy density readings on account of the emissivity of the powder being substantially higher and the thermal conductivity of the build plate or solidified powder material being greater than the effective thermal conductivity of the powder. The higher thermal conductivity reduces the amount of energy available for radiation back toward optical sensors thereby reducing detected thermal radiation. Furthermore, the lower emissivity of the material itself also reduces the amount of radiated thermal energy. F Thermal Energy Density Vs Global Energy Density Power provided by an energy source coming into the workpiece results in melting of material making the workpiece, but that power can also be dissipated by several other heat and mass transfer processes during an additive manufacturing process. The following equation describes different processes that can absorb the power emitted where the energy source is a laser scanning across a powder bed:

$$P_{TOTAL\ LASER\ POWER} = P_{OPTICAL\ LOSSES\ AT\ THE\ LASER} + P_{ABSORPTION\ BY\ CHAMBER\ GAS} + P_{REFLECTION} + P_{PARTICLE\ AND\ PLUME\ INTERACTIONS} + P_{POWER\ NEEDED\ TO\ SUSTAIN\ MELT\ POOL} + P_{CONDUCTION\ LOSSES} + P_{RADIATION\ LOSSES} + P_{CONVECTION\ LOSSES} + P_{VAPORIZATION\ LOSSES} \quad \text{Eq(13)}$$

Optical losses at the laser refers to power losses due to imperfections in the optical system responsible for transmitting and focusing laser light on the build plane. The imperfections result in absorption and reflection losses of the emitted laser within the optical system. Absorption by chamber gas refers to power loss due to gases within a build chamber of the additive manufacturing system absorbing a small fraction of the laser power. The impact of this power loss will depend on the absorptivity of the gas at the wavelength of the laser. Reflection losses refer to power lost due to light escaping the laser optics that is never absorbed by the powder bed. Particle and plume interactions refer to interactions between the laser and a plume and/or particles ejected during the deposition process. While power loss due to these affects can be ameliorated though shielding gas being circulated through the build chamber a small amount of power reduction generally can't be completely avoided. Power needed to sustain melt pool refers to the portion of the laser power absorbed by the working material for melting and ultimately superheating the powder to whatever temperature the melt pool ultimately achieves. Conduction losses refers to the portion of the power absorbed through conduction to solidified metal below the powder and the powder bed itself. In this way, the powder bed and solidified material making up the part will conduct heat away from the melt pool. This conductive transfer of thermal energy is the dominant form of energy loss from the melt pool. Radiation losses refers to that portion of the laser power that is emitted by the melt pool and material surrounding the melt pool that is hot enough to emit thermal radiation. Convection losses refer to losses caused by the transfer of heat energy to gases circulating through the build chamber. Finally, vaporization losses refer to a small fraction of powder material that will vaporize under laser irradiation. The latent heat of vaporization is very large, so this is a powerful cooling effect on the melt pool and can be a non-negligible source of energy loss as the total laser beam power goes higher.

The thermal energy density (TED) metric is based on measurement of optical light that is a result of the radiation of light from the heated regions, transmission of this light back through the optics, collection of the light by the detector, and conversion of this light into electrical signals. The equation governing blackbody radiation over all possible frequencies is given by the Stefan-Boltzmann equation shown below in Eq(14):

$$P_{RADIATED} = F_{HOT\text{-}OPTICS} \cdot \varepsilon \cdot \sigma \cdot A \cdot (T_{HOT}^4 - T_{BACKGROUND}^4) \quad \text{Eq(14)}$$

The variables from Eq(14) are shown below in Table (1).

TABLE 1

| | |
|---|---|
| E | Emissivity is defined as the ratio of the energy radiated from a material's surface to that radiated from a blackbody (a perfect emitter) at the same temperature and wavelength and under the same viewing conditions. |
| $F_{HOT\text{-}OPTICS}$ | This is the view factor between the regions of the build plane hot enough to radiate and the optics of the laser scan head. |
| $\Sigma$ | The Stefan - Boltzmann constant, 5.67 × 10 −8 watt per meter squared per degree kelvin to the fourth power |
| A | The area of the regions hot enough to radiate energy at any substantial amount. Note that in general this will be LARGER than the area of the melt pool. In other words, this term is NOT equivalent to the melt pool area. |
| $T_{HOT}$ | The average temperature in degrees K of the region hot enough to radiate in any significant amount. |
| $T_{BACKGROUND}$ | The temperature of the object or background medium to which the melt pool is radiating. This will generally be a significantly lower temperature, and therefore in practice this term is of negligible magnitude |

There are additional intervening factors impacting the radiated light before it is collected by the sensor and before it results in a voltage that is used to calculate the TED metric. This is summarized below in Eq(15):

$$V_{VOLTAGE\ USED\ BY\ TED} = \{P_{RADIATED} - P_{VIEW\ FACTOR} - P_{OPTICAL\ LOSSES\ AT\ RADIATED\ WAVELENGTHS} - P_{SENSOR\ LOSS\ FACTOR}\} * (\text{SENSOR SCALING FACTOR}) \quad \text{Eq(15)}$$

These various terms from Eq(15) are explained in Table (2) below.

TABLE 2

| | |
|---|---|
| $P_{RADIATED}$ | The radiated power previously discussed as the power radiated from the regions of the build plane (comprised of the melt pool and surrounding hot material) |
| $P_{VIEW\ FACTOR}$ | This loss term takes into account that not all of the radiated power leaving the hot region will enter the optics of the scan head, and that there is a geometric view factor effect governing the amount of energy that can be collected. This could be numerically calculated by knowing all the relevant geometries and employing a ray tracing scheme. |
| $P_{OPTICAL\ LOSSES\ AT\ RADIATED\ WAVELENGTHS}$ | This term accounts for losses due to the optics of the scan head and associated partially reflective and wavelength dependent mirrors that allow the light to go back through the scan head optics and to be collected at the sensor |
| $P_{SENSOR\ LOSS\ FACTOR}$ | The sensor itself will have wavelength-dependent absorption characteristics |
| SENSOR SCALING FACTOR | This is a numerical factor for how photons received by photodiode are converted to electrons and result in a measureable voltage |

Often in additive manufacturing, a figure of merit that is used is the global energy density (GED). This is a parameter that combines various PROCESS INPUTS as shown below in Eq(16):

$$\text{GED} = (\text{BEAM POWER}) / \{(\text{TRAVEL SPEED}) * (\text{HATCH SPACING})\} \quad \text{Eq(16)}$$

We notice that GED has units of energy per unit area: $(\text{JOULES/SEC})/\{(\text{CM/SEC})*(\text{CM})\} = \text{JOULES/CM}^2$. However, it should be noted that although GED may have the same unites as TED, GED and TED are NOT generally equivalent. As an example, TED is derived from the radiated power from the hot region divided by an area, whereas GED is a measure of input power. As described herein, TED relates to RESPONSE or PROCESS OUTPUT, whereas GED relates to a PROCESS INPUT. The inventors believe that, as a result, TED and GED are different measures from each other. In some embodiments, the area utilized in determining TED differs from the melt pool area. As a result, some embodiments do not have a direct correlation between TED and the melt pool area. Beneficially, TED is sensitive to a wide range of factors which directly impact the additive manufacturing process.

While the embodiments described herein have used data generated by optical sensors to determine the thermal energy density, the embodiments described herein may be implemented using data generated by sensors that measure other manifestations of in-process physical variables. Sensors that measure manifestations of in-process physical variables include, for example, force and vibration sensors, contact thermal sensors, non-contact thermal sensors, ultrasonic sensors, and eddy current sensors. It will be apparent to one of ordinary skill in the art that many modifications and variations are possible in view of the above teachings.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An additive manufacturing method, comprising:
   generating a plurality of scans of an energy source across a build plane;
   measuring an amount of energy radiated from the build plane during each of the plurality of scans using an optical sensor monitoring the build plane;
   determining an area of the build plane traversed during one or more scans of the plurality of scans of the energy source;
   determining a thermal energy density for the area of the build plane traversed by the one or more scans of the plurality of scans based upon the amount of energy radiated and the area of the build plane traversed by the plurality of scans;
   mapping the thermal energy density to one or more locations of the build plane;
   determining that the thermal energy density is characterized by a density outside a range of density values; and
   thereafter, adjusting subsequent scans of the energy source across or proximate the one or more locations of the build plane.

2. The additive manufacturing method of claim 1 wherein the measuring an amount of energy comprises receiving sensor readings from the optical sensor.

3. The additive manufacturing method of claim 1 wherein determining the area of the build plane traversed comprises determining a start point of a first scan of the plurality of scans;

determining an end point of the first scan; and determining a length of the first scan by calculating a distance between the start point and the end point.

4. The additive manufacturing method of claim 1 wherein determining that the thermal energy density is characterized by a density outside a range of density values further comprises:

receiving a baseline;

determining one of more thermal energy density scan values are substantially different than the baseline; and outputting at least one of a graph and a point cloud.

5. The additive manufacturing method of claim 4, wherein determining that the thermal energy density is characterized by a density outside a range of density values further comprises:

transmitting a control signal associated with a process parameter.

6. The additive manufacturing method of claim 1 wherein the energy source corresponds to at least one of a laser and an electron beam.

7. The additive manufacturing method of claim 1 wherein mapping the thermal energy density comprises:

receiving energy source drive signal data indicating a path of the energy source across the build plane; and determining a location of each of the plurality of scans using the energy source drive signal data.

8. The additive manufacturing method of claim 1 further comprising:

receiving position data associated with the energy source.

9. The additive manufacturing method of claim 1, further comprising:

receiving energy source drive signal data, wherein the energy source drive signal data indicates when the energy source is turned on and when the energy source is turned off.

10. An additive manufacturing method, comprising:

dividing a build plane into a plurality of grid regions, wherein each of the grid region has a grid area;

generating a plurality of scans of an energy source across the build plane;

generating sensor readings during each of the plurality of scans using an optical sensor;

determining a total amount of energy radiated from the build plane during the plurality of scans using the sensor readings;

computing a thermal energy density associated with a grid region of the plurality of grid regions based upon the total amount of energy radiated from the grid region and the grid area of the grid region;

determining that the thermal energy density associated with the grid region is characterized by a thermal energy density outside a range of thermal energy density values; and thereafter, adjusting an output of the energy source.

11. The additive manufacturing method of claim 10, wherein the thermal energy density is determined by dividing the total amount of energy radiated from the grid region by the grid area.

12. The additive manufacturing method of claim 10, wherein a width of the grid region is sized in accordance with a length of each of the plurality of scans.

13. The additive manufacturing method of claim 10, determining a grid region including the plurality of scans comprises:

receiving energy source drive signal data indicating a path of the energy source across the build plane; and defining a location, shape and size of the grid region based upon the energy source drive signal data.

14. The additive manufacturing method of claim 13, wherein the energy source drive signal data includes a distance between two or more scans of the plurality of scans.

15. An additive manufacturing method, comprising:

dividing at least a portion of a build plane into a plurality of grid regions each having a grid area;

generating a plurality of scans of an energy source across the build plane;

generating sensor readings during each of the plurality of scans using an optical sensor;

for each of the plurality of scans, mapping portions of each of the sensor readings to a respective one of the plurality of grid regions;

for each of the plurality of grid regions:

summing the sensor readings mapped to each grid region; and computing a thermal energy density based on the summed sensor readings and the grid area;

determining that the thermal energy density associated with one or more of the plurality of grid regions is characterized by a thermal energy density outside a range of thermal energy density values; and thereafter, adjusting an output of the energy source.

16. The additive manufacturing method as recited in claim 15, further comprising:

providing a powder layer across the build plane;

generating an additional plurality of scans of the energy source across the powder layer, wherein characteristics of at least some of the additional plurality of scans are based on the computed thermal energy density of one or more of the plurality of grid regions.

17. The additive manufacturing method of claim 15 wherein one or more input parameters of the energy source is changed during at least a portion of one of the plurality of scans based on the computed thermal energy density.

18. The additive manufacturing method of claim 15 wherein mapping portions of each of the sensor readings comprises mapping all of the sensor readings for one of the plurality of scans to one or more of the plurality of grid regions.

19. The additive manufacturing method of claim 15, wherein the plurality of grid regions extend across an entirety of the build plane.

20. The additive manufacturing method of claim 15, wherein the grid regions are distributed evenly across the build plane.

* * * * *